US012536056B2

United States Patent
Guo et al.

(10) Patent No.: US 12,536,056 B2
(45) Date of Patent: Jan. 27, 2026

(54) HARDWARE ACCELERATED SYNCHRONIZATION WITH ASYNCHRONOUS TRANSACTION SUPPORT

(71) Applicant: NVIDIA Corporation, Santa Clara, CA (US)

(72) Inventors: Timothy Guo, Santa Clara, CA (US); Jack Choquette, Santa Clara, CA (US); Shirish Gadre, Santa Clara, CA (US); Olivier Giroux, Santa Clara, CA (US); Harold Carter Edwards, Santa Clara, CA (US); John Edmondson, Santa Clara, CA (US); Manan Patel, Santa Clara, CA (US); Raghavan Madhavan, Santa Clara, CA (US); Jessie Huang, Santa Clara, CA (US); Peter Nelson, Santa Clara, CA (US); Ronny Krashinsky, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 673 days.

(21) Appl. No.: 17/691,296

(22) Filed: Mar. 10, 2022

(65) Prior Publication Data

US 2023/0289242 A1 Sep. 14, 2023

(51) Int. Cl.
*G06F 3/00* (2006.01)
*G06F 9/52* (2006.01)

(52) U.S. Cl.
CPC ........ *G06F 9/522* (2013.01); *G06F 2209/521* (2013.01)

(58) Field of Classification Search
CPC ...................................................... G06F 9/522
See application file for complete search history.

(56) References Cited

U.S. PATENT DOCUMENTS

| 6,161,208 | A  | * | 12/2000 | Dutton ................ G06F 12/0897 |
| | | | | 714/E11.037 |
| 6,466,988 | B1 | * | 10/2002 | Sukegawa ........... G06F 12/0815 |
| | | | | 709/248 |
| 7,506,134 | B1 |   | 3/2009  | Juffa |
| 7,512,950 | B1 | * | 3/2009  | Marejka .................. G06F 9/522 |
| | | | | 718/102 |
| 7,584,342 | B1 | * | 9/2009  | Nordquist ........... G06F 9/38885 |
| | | | | 712/22 |

(Continued)

FOREIGN PATENT DOCUMENTS

JP          2005071109 A  *  3/2005  ............. G06F 9/522

OTHER PUBLICATIONS

Leonidas, Scheduler-Conscious Synchronization. (Year: 1997).*

(Continued)

*Primary Examiner* — Lechi Truong
(74) *Attorney, Agent, or Firm* — Nixon & Vanderhye, P.C.

(57) ABSTRACT

A new transaction barrier synchronization primitive enables executing threads and asynchronous transactions to synchronize across parallel processors. The asynchronous transactions may include transactions resulting from, for example, hardware data movement units such as direct memory units, etc. A hardware synchronization circuit may provide for the synchronization primitive to be stored in a cache memory so that barrier operations may be accelerated by the circuit. A new wait mechanism reduces software overhead associated with waiting on a barrier.

28 Claims, 22 Drawing Sheets

(56) References Cited

U.S. PATENT DOCUMENTS

| | | | |
|---|---|---|---|
| 7,788,468 B1 | 8/2010 | Nickolls | |
| 7,836,118 B1 | 11/2010 | Juffa | |
| 7,945,128 B1* | 5/2011 | Binkert | B82Y 20/00 |
| | | | 385/24 |
| 8,112,614 B2 | 2/2012 | Nickolls | |
| 9,639,466 B2 | 5/2017 | Robertson | |
| 10,909,033 B1 | 2/2021 | Fang | |
| 11,080,051 B2 | 8/2021 | Kerr | |
| 2002/0194436 A1* | 12/2002 | McKenney | G06F 9/3834 |
| | | | 711/152 |
| 2006/0143361 A1* | 6/2006 | Kottapalli | G06F 12/0857 |
| | | | 711/E12.039 |
| 2006/0150010 A1* | 7/2006 | Stiffler | G06F 11/1438 |
| | | | 714/13 |
| 2006/0212868 A1* | 9/2006 | Takayama | G06F 9/522 |
| | | | 718/100 |
| 2007/0113232 A1* | 5/2007 | Collard | G06F 9/52 |
| | | | 718/101 |
| 2007/0250668 A1* | 10/2007 | Arimilli | G06F 12/0815 |
| | | | 711/E12.026 |
| 2007/0288694 A1* | 12/2007 | Ghai | G06F 9/3834 |
| | | | 711/118 |
| 2008/0250203 A1* | 10/2008 | Schreter | G06F 9/52 |
| | | | 711/E12.07 |
| 2009/0044194 A1* | 2/2009 | Rathi | G06F 9/526 |
| | | | 718/100 |
| 2010/0250809 A1* | 9/2010 | Ramesh | G06F 9/526 |
| | | | 710/200 |
| 2010/0333095 A1* | 12/2010 | Shavit | G06F 3/3004 |
| | | | 711/147 |
| 2011/0078692 A1* | 3/2011 | Nickolls | G06F 9/30087 |
| | | | 718/103 |
| 2011/0219208 A1* | 9/2011 | Asaad | G06F 9/06 |
| | | | 712/12 |
| 2012/0159121 A1* | 6/2012 | Inoue | G06F 15/17325 |
| | | | 712/30 |
| 2013/0117750 A1* | 5/2013 | Howes | G06F 9/524 |
| | | | 718/102 |
| 2013/0219145 A1* | 8/2013 | Isherwood | G06F 12/0828 |
| | | | 711/168 |
| 2013/0305021 A1* | 11/2013 | Grover | G06F 9/3885 |
| | | | 712/214 |
| 2014/0019724 A1* | 1/2014 | Fahs | G06F 9/30087 |
| | | | 712/216 |
| 2014/0195480 A1* | 7/2014 | Talagala | G06F 16/2365 |
| | | | 707/610 |
| 2016/0170813 A1* | 6/2016 | Robison | G06F 9/522 |
| | | | 718/106 |
| 2016/0246641 A1* | 8/2016 | Kogan | G06F 3/0629 |
| 2016/0283245 A1* | 9/2016 | Ben-Kiki | G06F 9/30087 |
| 2017/0061569 A1* | 3/2017 | Sathe | G06T 1/60 |
| 2018/0307529 A1* | 10/2018 | Koker | G06F 9/4881 |
| 2020/0151028 A1* | 5/2020 | Sura | G06F 9/522 |
| 2021/0124627 A1* | 4/2021 | Giroux | G06F 9/546 |
| 2021/0382717 A1* | 12/2021 | Jiang | G06F 9/30087 |
| 2021/0382720 A1* | 12/2021 | Ganapathy | G06F 9/3009 |
| 2023/0288471 A1 | 9/2023 | Duluk | |
| 2023/0289189 A1 | 9/2023 | Bangalore Prabhakar | |
| 2023/0289190 A1 | 9/2023 | Parle | |
| 2023/0289211 A1 | 9/2023 | Hirota | |
| 2023/0289212 A1 | 9/2023 | Duluk | |
| 2023/0289215 A1 | 9/2023 | Palmer | |
| 2023/0289292 A1 | 9/2023 | Minkin | |
| 2023/0289304 A1 | 9/2023 | Minkin | |
| 2023/0289398 A1 | 9/2023 | Choquette | |
| 2023/0315655 A1 | 10/2023 | Choquette | |

OTHER PUBLICATIONS

Stamatis Kavadias, On-chip Communication and Synchronization Mechanisms with Cache-Integrated Network Interfaces. (Year: 2010).*

Lindholm et al, "NVIDIA Tesla: A Unified Graphics and Computing Architecture," IEEE Micro, (2008).

Choquette et al, "Volta: Performance and Programmability", IEEE Micro (vol. 38, Issue: 2, Mar./Apr. 2018), DOI: 10.1109/MM.2018.022071134.

* cited by examiner

Example General Processing Cluster

HARDWARE ACCELERATED SYNCHRONIZATION WITH ASYNCHRONOUS TRANSACTION SUPPORT

CROSS-REFERENCES TO RELATED APPLICATIONS

This application is related to the following commonly-assigned copending US patent applications, the entire contents of each of which are incorporated by reference:
- U.S. application Ser. No. 17/691,276 filed Mar. 10, 2022, titled "Method And Apparatus For Efficient Access To Multidimensional Data Structures And/Or Other Large Data Blocks";
- U.S. application Ser. No. 17/691,621 filed Mar. 10, 2022, titled "Cooperative Group Arrays";
- U.S. application Ser. No. 17/691,690 filed Mar. 10, 2022, titled "Distributed Shared Memory";
- U.S. application Ser. No. 17/691,759 filed Mar. 10, 2022, titled "Virtualizing Hardware Processing Resources in a Processor";
- U.S. application Ser. No. 17/691,288 filed Mar. 10, 2022, titled "Programmatically Controlled Data Multicasting Across Multiple Compute Engines";
- U.S. application Ser. No. 17/691,303 filed Mar. 10, 2022, titled "Fast Data Synchronization In Processors And Memory";
- U.S. application Ser. No. 17/691,406 filed Mar. 10, 2022, titled "Efficient Matrix Multiply and Add with a Group of Warps";
- U.S. application Ser. No. 17/691,872 filed Mar. 10, 2022, titled "Techniques for Scalable Load Balancing of Thread Groups in a Processor";
- U.S. application Ser. No. 17/691,808 filed Mar. 10, 2022, titled "Flexible Migration of Executing Software Between Processing Components Without Need For Hardware Reset"; and
- U.S. application Ser. No. 17/691,422 filed Mar. 10, 2022, titled "Method And Apparatus For Efficient Access To Multidimensional Data Structures And/Or Other Large Data Blocks".

FIELD

This technology generally relates to improving processing efficiency and reducing power consumption of processors. More particularly, the technology herein relates to specialized circuitry for handling synchronization.

BACKGROUND

Users want deep learning and high performance computing (HPC) compute programs to continue to scale as graphics processing unit (GPU) technology improves and the number of processing core units increases per chip with each generation. What is desired is a faster time to solution for a single application, not scaling only by running N independent applications.

FIG. 1A shows example deep learning (DL) networks comprising long chains of sequentially-dependent compute-intensive layers. Each layer is calculated using operations such as e.g., multiplying input activations against a matrix of weights to produce output activations. The layers are typically parallelized across a GPU or cluster of GPUs by dividing the work into output activation tiles each representing the work one processing core will process.

Due to the potentially massive number of computations deep learning requires, faster is usually the goal. And it makes intuitive sense that performing many computations in parallel will speed up processing as compared to performing all those computations serially. In fact, the amount of performance benefit an application will realize by running on a given GPU implementation typically depends entirely on the extent to which it can be parallelized. But there are different approaches to parallelism.

Conceptually, to speed up a process, one might have each parallel processor perform more work (see FIG. 1B) or one might instead keep the amount of work on each parallel processor constant and add more processors (see FIG. 1C). Consider an effort to repave a highway several miles long. You as the project manager want the repaving job done in the shortest amount of time in order to minimize traffic disruption. It is obvious that the road repaving project will complete more quickly if you have several crews working in parallel on different parts of the road. But which approach will get the job done more quickly—asking each road crew to do more work, or adding more crews each doing the same amount of work? It turns out that the answer depends on the nature of the work and the resources used to support the work.

Computer scientists refer to the first approach as "weak scaling" and the second approach as "strong scaling."

Users of such applications thus typically want strong scaling, which means a single application can achieve higher performance without having to change its workload—for instance, by increasing its batch size to create more inherent parallelism. Users also expect increased speed performance when running existing (e.g., recompiled) applications on new, more capable GPU platforms offering more parallel processors. GPU development has met or even exceeded the expectations of the marketplace in terms of more parallel processors and more coordination/cooperation between increased numbers of parallel execution threads running on those parallel processors—but further performance improvements to achieve strong scaling are still needed.

Parallel processing also creates the need for communication and coordination between parallel execution threads or blocks. Synchronization primitives are an essential building block to parallel programming. Besides the functionality correctness such a synchronization primitives guarantees, they also contribute to improved performance and scalability.

One way for different execution processes to coordinate their states with one another is by using barrier synchronization. Barrier synchronization typically involves each process in a collection of parallel-executing processes waiting at a barrier until all other processes in the collection catch up. No process can proceed beyond the barrier until all processes reach the barrier.

An example of a useful application that will benefit from synchronization barriers is "asynchronous compute." With asynchronous compute, GPU utilization is increased by scheduling tasks out of order rather than in strict sequence so that "later" (in the sequence) computations can be performed at the same time as "earlier" (in the sequence) computations. As one example, when rendering graphics, instead of running a shader sequentially with other workloads, asynchronous compute may allow execution of the shader simultaneously with other work. While the GPU API may be designed to assume that most or all calls are independent, the developer is also provided with control over how tasks are scheduled and to implement barriers to ensure correctness such as when one operation depends on the result of another. See for example U.S. Pat. Nos. 9,117,284 and 10,217,183.

Hardware-based synchronization mechanisms have been included in GPUs to support such kinds of synchronization barrier functions. See e.g., Xiao et al, "Inter-Block GPU Communication via Fast Barrier Synchronization," 2010 IEEE International Symposium on Parallel & Distributed Processing (IPDPS) (19-23 Apr. 2010). Compute-capable GPUs with such hardware-based synchronization capabilities have usually been programmed in the bulk-synchronous style—wide parallel tasks with barrier synchronization within, and fork/join between. See for example US Patent Publication No. 2015020558.

In modern GPU architectures, many execution threads execute concurrently, and many warps each comprising many threads also execute concurrently. When threads in a warp need to perform more complicated communications or collective operations, the developer can use for example NVIDIA's CUDA "_syncwarp" primitive to synchronize threads. The syncwarp primitive initializes hardware mechanisms that cause an executing thread to wait before resuming execution until all threads specified in a mask have called the primitive with the same mask. For more details see for example U.S. Pat. Nos. 8,381,203; 9,158,595; 9,442,755; 9,448,803; 10,002,031; and 10,013,290; and see also https://devblogs.nvidia.com/using-cuda-warp-level-primitives/; and https://docs.nvidia.com/cuda/cuda-c-programming-guide/index.html#memory-fence-functions.

Before NVIDIA's Cooperative Groups API, both execution control (i.e., thread synchronization) and inter-thread communication were generally limited to the level of a thread block (also called a "cooperative thread array" or "CTA") executing on one SM. The Cooperative Groups API extended the CUDA programming model to describe synchronization patterns both within and across a grid or across multiple grids and thus potentially (depending on hardware platform) spanning across devices or multiple devices. The Cooperative Groups API provides CUDA device code APIs for defining, partitioning, and synchronizing groups of threads—where "groups" are programmable and can extend across thread blocks. The Cooperative Groups API also provides host-side APIs to launch grids whose threads are all scheduled by software-based scheduling to be launched concurrently. These Cooperative Groups API primitives enable additional patterns of cooperative parallelism within CUDA, including producer-consumer parallelism and global synchronization across an entire thread grid or even across multiple GPUs, without requiring hardware changes to the underlying GPU platforms.

For example, the Cooperative Groups API provides a grid-wide (and thus often device-wide) synchronization barrier ("grid.sync( )") that can be used to prevent threads within the grid group from proceeding beyond the barrier until all threads in the defined grid group have reached that barrier. Such device-wide synchronization is based on the concept of a grid group ("grid_group") defining a set of threads within the same grid, scheduled by software to be resident on the device and schedulable on that device in such a way that each thread in the grid group can make forward progress. Thread groups could range in size from a few threads (smaller than a warp) to a whole thread block, to all thread blocks in a grid launch, to grids spanning multiple GPUs. Newer GPU platforms such as NVIDIA Pascal and Volta GPUs enable grid-wide and multi-GPU synchronizing groups, and Volta's independent thread scheduling enables significantly more flexible selection and partitioning of thread groups at arbitrary cross-warp and sub-warp granularities.

Such software-implemented barriers offer flexibility but have not necessarily provided the same levels of performance as hardware-implemented barriers. For example, some developers in the past used hardware to implement as many barriers as were supported by the platform hardware, and if more (or different kinds of) barriers were needed, implemented additional barriers in software. See for example the arrive-wait barrier described in U.S. patent application Ser. No. 16/712,236 filed Dec. 12, 2019 titled "High Performance Synchronization Mechanisms for Coordinating Operations on a Computer System" which is hereby incorporated in its entirety by reference. Developers who implemented additional synchronization barriers in software often suffered loss of performance. For example, over allocating barriers could mean fewer paths of execution and correspondingly decreased performance.

There is a need for improved hardware-accelerated synchronization barriers that yield the flexibility and programmability of software barriers across parallel processors while also yielding the efficiencies provided by hardware barriers.

DETAILED DESCRIPTION OF EXAMPLE NON-LIMITING EMBODIMENTS

Embodiments of this disclosure are directed to a new synchronization primitive and an associated hardware-implemented synchronization unit. Example embodiments provide a flexibility offered by software barrier implementations, and an efficiency offered by conventional hardware barrier implementations mentioned above. In addition, the new synchronization primitive and associated application programming interface (API) and Instruction Set Architecture (ISA) support efficient increased concurrency across different hardware partitions offered for example by the cooperative group array (CGA) constructs of new GPU implementations.

Figure 1A:
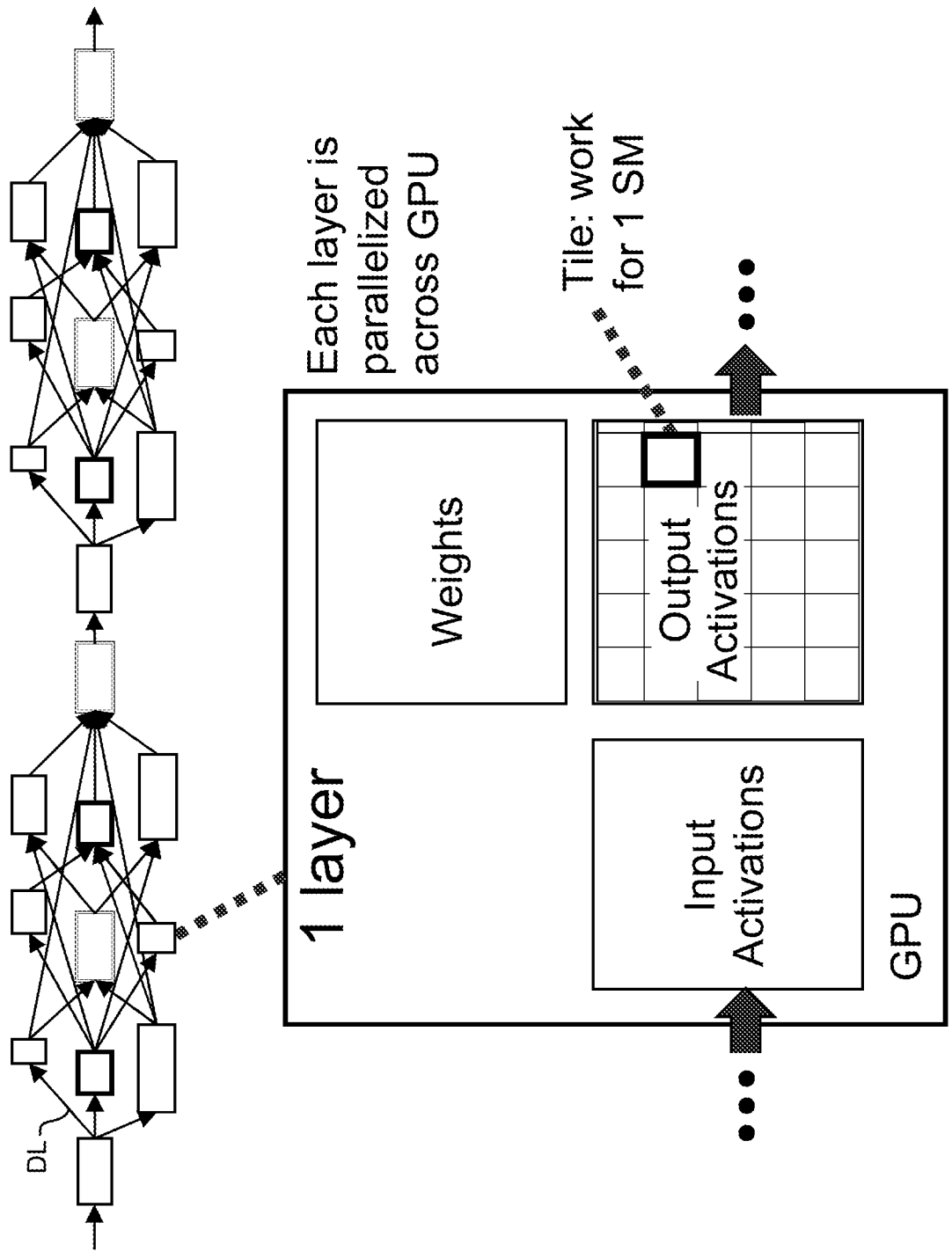
FIG. 1A shows an example application running on a GPU.
Figure 1C:
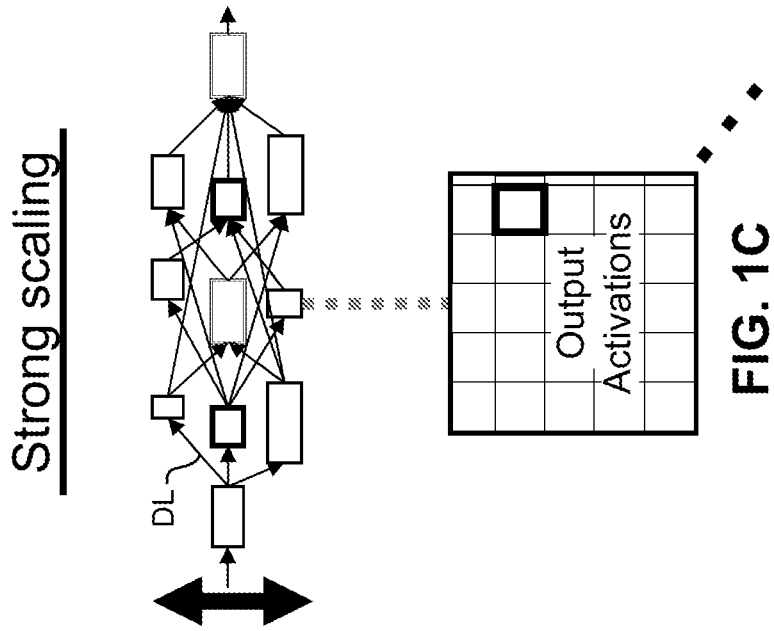
FIG. 1C shows a strong scaling deep learning scenario.
Figure 1B:
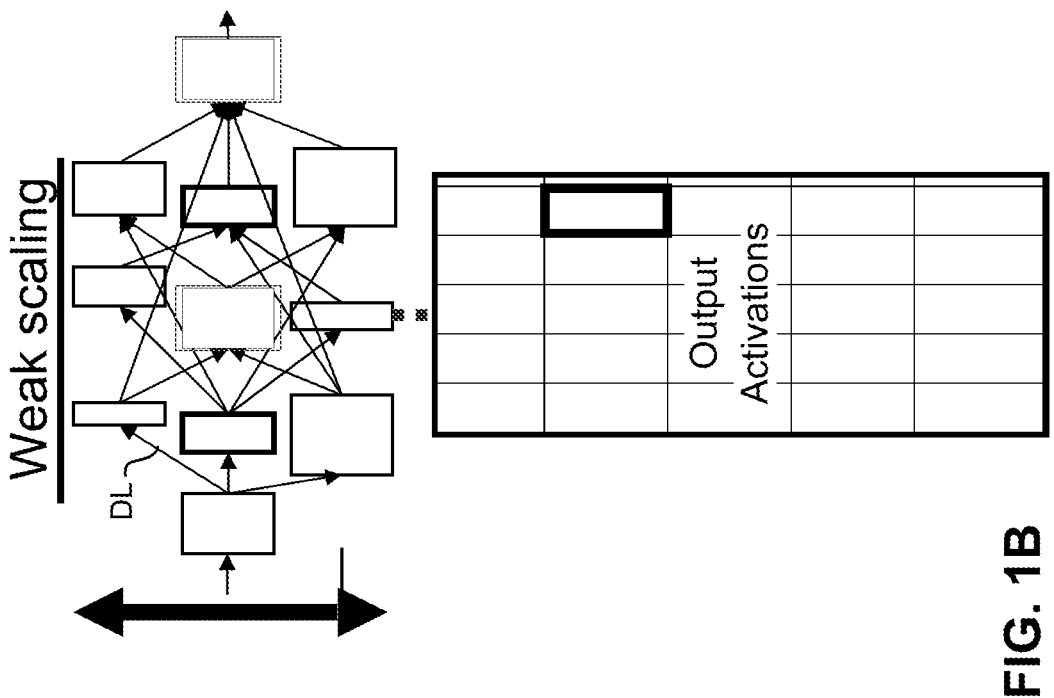
FIG. 1B shows a weak scaling deep learning scenario.

Strong scaling was described above in relation to FIG. 1A-1C, and refers to GPU design improvements such that the same amount of work (compared to a previous generation of GPU) can be performed at multiple times the speed on a faster processor. This effectively reduces the tile size allocated to each processor. To achieve strong scaling, GPU designers prefer to have tiles that are as small as possible. The shrinking per-processor, such as, for example, a streaming multiprocessor (SM), workload size tends to hurt data reuse and thus requires higher data feeding rate. On the other hand, the math throughput within a SM also tends to increase in each generation, which also demands for higher data feeding bandwidth.

Since wires are expensive and do not scale as well as processing bandwidth, brute-force adding wires for extra bandwidth is no longer a feasible option. Instead, embracing locality is viewed as a more promising design choice. The goal of the embodiments described herein is to enable efficient data sharing and localized communication at a level greater than one SM. Besides new cross-SM cooperation mechanisms, proper synchronization primitives play a critical role in such design.

Conventionally, CUDA provides the hardware named barrier as its core synchronization primitive which mostly follows the BSP (Bulk Synchronous Parallel) model. The arrive-wait barrier described in U.S. patent application Ser. No. 16/712,236 filed Dec. 12, 2019 was introduced to better serve the producer-consumer style synchronization. However, named barriers and arrive-wait barriers while highly useful each have their own weaknesses. For example, a hardware named barrier is a dedicated processor-local resource that provides a limited number of barriers and which is difficult to expose to software, may be incompatible with the thread programming model, may provide inefficient support for producer-consumer communication, and may be hard to extend to cross-processor synchronization. The arrive-wait barrier does not suffer from many of these disadvantages but is often implemented as a shared-memory backed resource that provides a software-polling based wait operation. Such an arrive-wait barrier may incur a latency exposure and a substantial bandwidth cost to shared memory traffic. For example, given the extensive additional cross-processor guaranteed concurrency the CGA programming model provides, more efficient cross-processor asynchronous data exchange and associated synchronization could result in substantial performance improvements by reducing bandwidth requirements across long data paths between parallel processors.

In this disclosure, a new barrier type referred to herein as a "transaction barrier" is introduced to provide synchronization semantics for threads and for cross-processor and other asynchronous data exchanges. A dedicated hardware unit or device referred to herein as the "synchronization unit" is also provided to enable transaction barrier operations to be highly efficient.

The transaction barrier can extend or replace the shared-memory backed arrive-wait barrier in certain implementations, sharing its advantages over the conventional hardware named barrier. That is, at least in some embodiments, the transaction barrier is a fully software-managed resource with a clear software exposure story, a thread compatible programming model and efficient producer-consumer communication pattern support. In an environment such as, for example, a GPU incorporating "cooperative group arrays (CGA)", described in U.S. patent application Ser. No. 17/691,621, and distributed shared memory, described in U.S. patent application Ser. No. 17/691,690, the transaction barrier can receive arrival updates from cooperative thread arrays (CTAs, where a CGA includes a plurality of CTAs) in the same CGA that are running on different SMs, extending the synchronization scope to cross-SM/cross-processor arrangements.

In addition to the thread-arrival tracking capability of the arrive-wait barrier, the transaction barrier introduces the new capability of transaction-arrival tracking and allows user threads to synchronize against both other user threads and asynchronous hardware transactions, which may be generated during, or as a result of, execution of asynchronous data movement features. This new transaction tracking capability may enable the following example data sharing and localized communication patterns, which ultimately lead to strong scaling, from a programming model's perspective:

A group of consumer CTAs knowing when data is ready when receiving multicast memory data from loads issued by one producer CTA, thus saving bandwidth on layer 2 (L2) cache and interconnection (an example multicast implementation is described in U.S. patent application Ser. No. 17/691,406);

Direct inter-CTA localized data communication with "speed of light" (SOL, half round-trip) synchronization latency (described in U.S. patent application Ser. No. 17/691,303) within the CGA, thus saving both L2 cache/interconnection bandwidth and synchronization latency; and Direct inter-CTA localized synchronization within CGA, saving round-trip latency to global memory.

In some embodiments, the synchronization unit provides the desired hardware acceleration to the entire, or substantial portion of the, semantic set defined by the transaction barrier, especially the transaction tracking capabilities that are highly integrated with the asynchronous data exchange features supported by the transaction barrier. A hardware waiting acceleration capability provided in the synchronization unit eliminates, or at least drastically reduces, the latency cost associated with the conventional polling loop used in conventional implementations, and may also integrate with other synchronization hardware circuits such as, for example, a convergence barrier unit (CBU) for native thread programming model support. In some embodiments, a caching and coalescing capability in the synchronization unit minimizes the bandwidth cost incurred due to synchronization traffic.

The transaction barrier and the synchronization unit described in this disclosure may provide several new capabilities and properties such as, for example, those described in the next seven paragraphs.

The transaction barrier tracks both thread arrival and transaction arrival, and allows user threads to synchronize against both at the same time. In some embodiments, transaction arrival may be tracked by a zero-balanced counter without a pre-armed expectation count. The expectation on transaction count may be programmed by the user on each usage of the barrier.

The transaction barrier places only minimal requirements on the relative ordering between different arrival events. The expectation can be set by any participating thread before its arrival on the barrier, before or after the associated data transactions. For example, both producer and consumer threads can program the expectation (see FIGS. 6A and 6B), whichever fits a particular usage scenario better.

The transaction barrier may provide synchronization semantics for capabilities such as copy engines (e.g., direct memory access (DMA) units), the CGA feature (described in U.S. patent application Ser. No. 17/691,621), "speed-of-light" data exchange between SMs (described in U.S. patent application Ser. No. 17/691,303), programmatic multicast (described in U.S. patent application Ser. No. 17/691,288), and the tensor memory access unit (TMAU) (described in U.S. patent application Ser. No. 17/691,276 and in U.S. application Ser. No. 17/691,422), and other data movement operations performed by hardware units.

The synchronization unit provides programmability through general primitives to emulate non-standard synchronization patterns that are not directly built into the hardware.

The synchronization unit may provide hardware accelerated waiting support on software managed synchronization objects in memory. Both pre-defined transaction barriers and user-defined synchronization objects are supported by the accelerated waiting.

The synchronization unit provides thread programming model support for transaction barrier acceleration. Each thread can participate in the transaction barrier synchronization based on its independent decision. No functional requirement is imposed on warp-synchronous execution. For waiting operations, the thread semantics is maintained through integration with the convergence barrier unit (CBU).

The synchronization unit may be deeply integrated with asynchronous data exchange features designs, providing aggressive caching and coalescing to minimize the bandwidth cost from the synchronization traffic. The asynchronous data exchange features include, but are not limited to: DMA and like copy engines, programmatic multicast, TMA unit, SOL data exchange between SMs and certain load/store commands (e.g., the fused atomic load/store command (LDGSTS) in some embodiments).

Overview of Example GPU Environment

Figure 2:
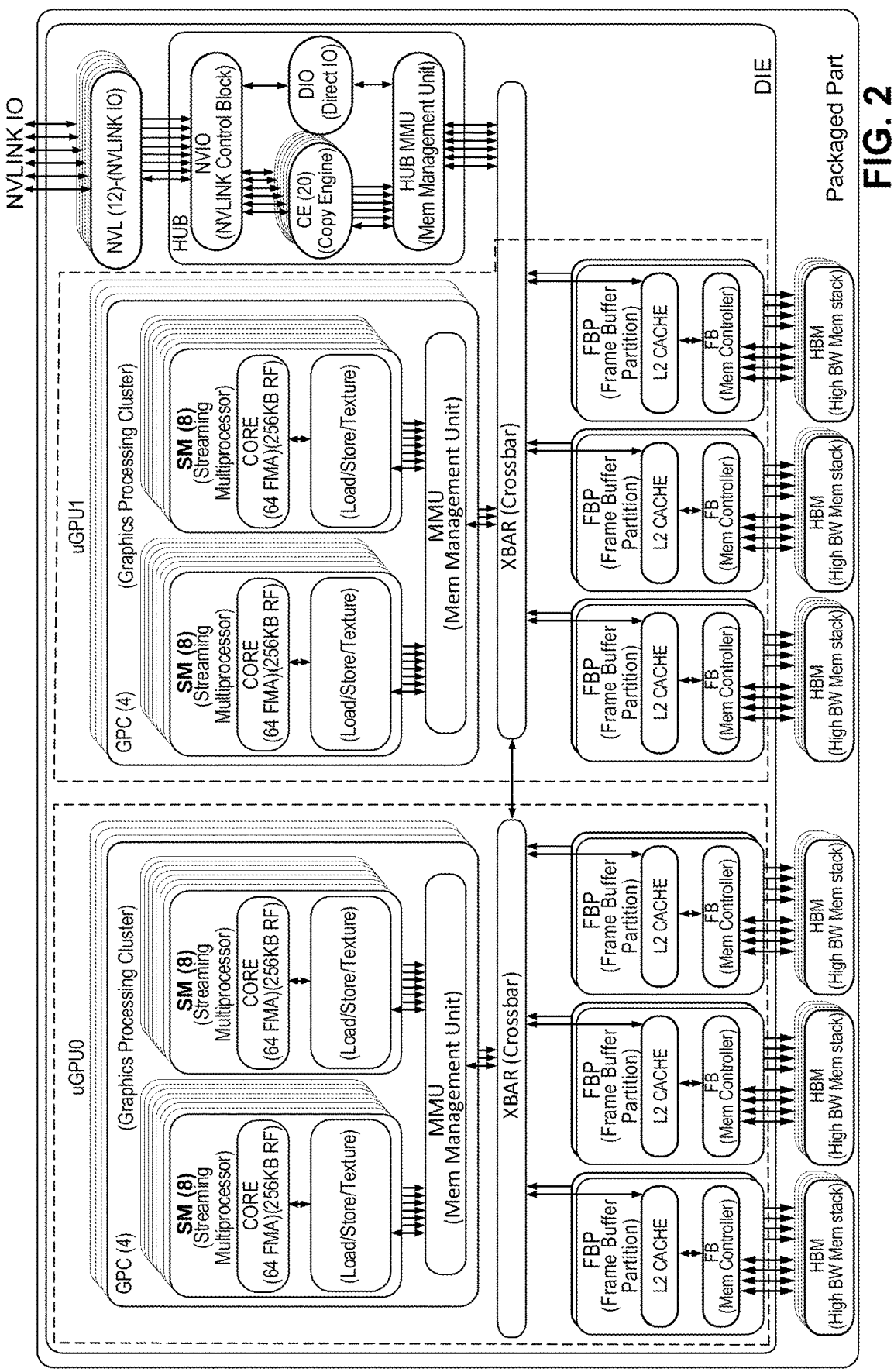
FIG. 2 is a block architectural diagram of a GPU architecture including streaming multiprocessors and associated interconnects partitioned in to different μGPC partitions.
Figure 3A:
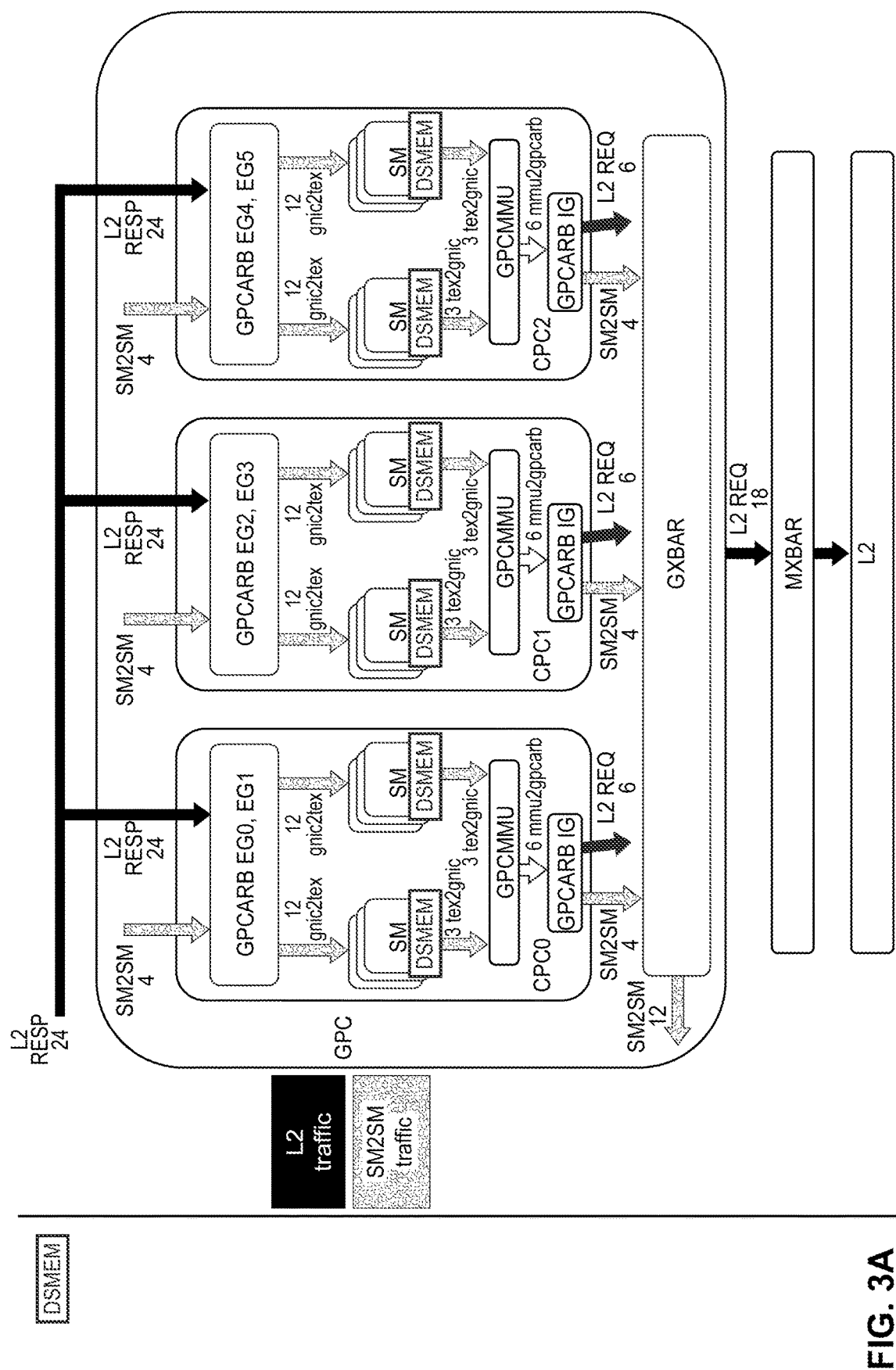
FIG. 3A-3D are block diagrams showing example communication paths among streaming multiprocessors and memory in a GPU architecture such as that shown in FIG. 2.
Figure 3B:
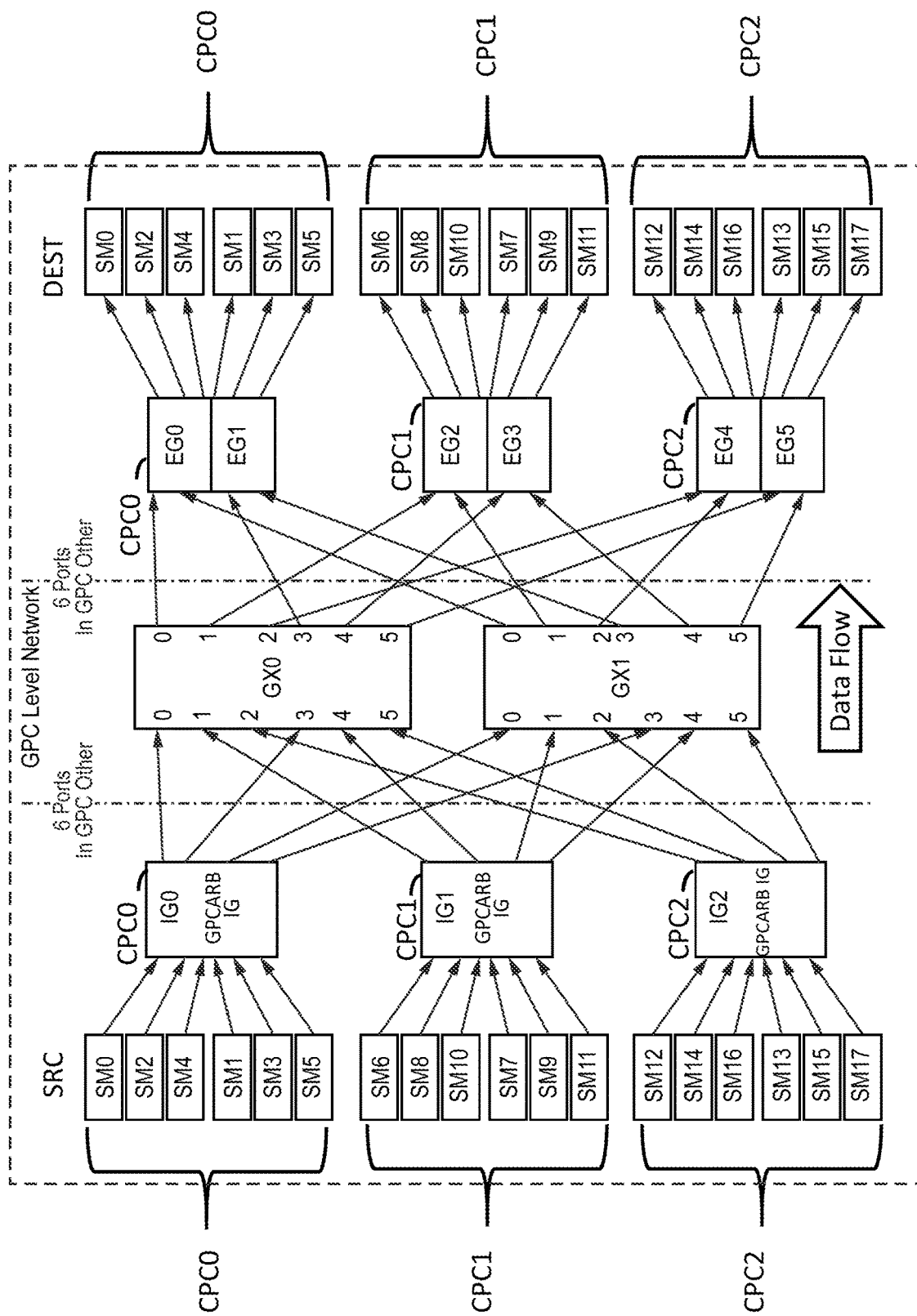
Figure 3C:
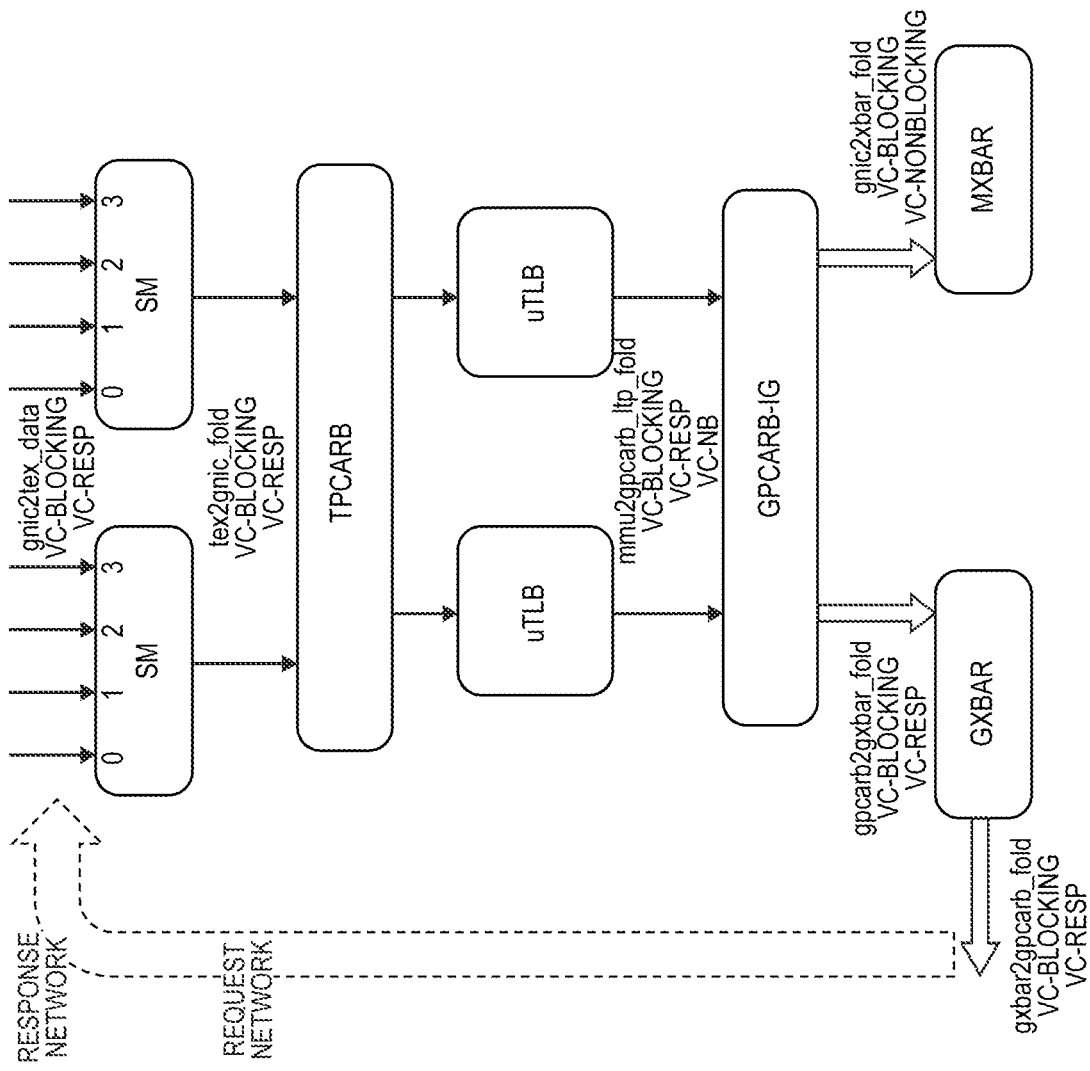
Figure 3D:
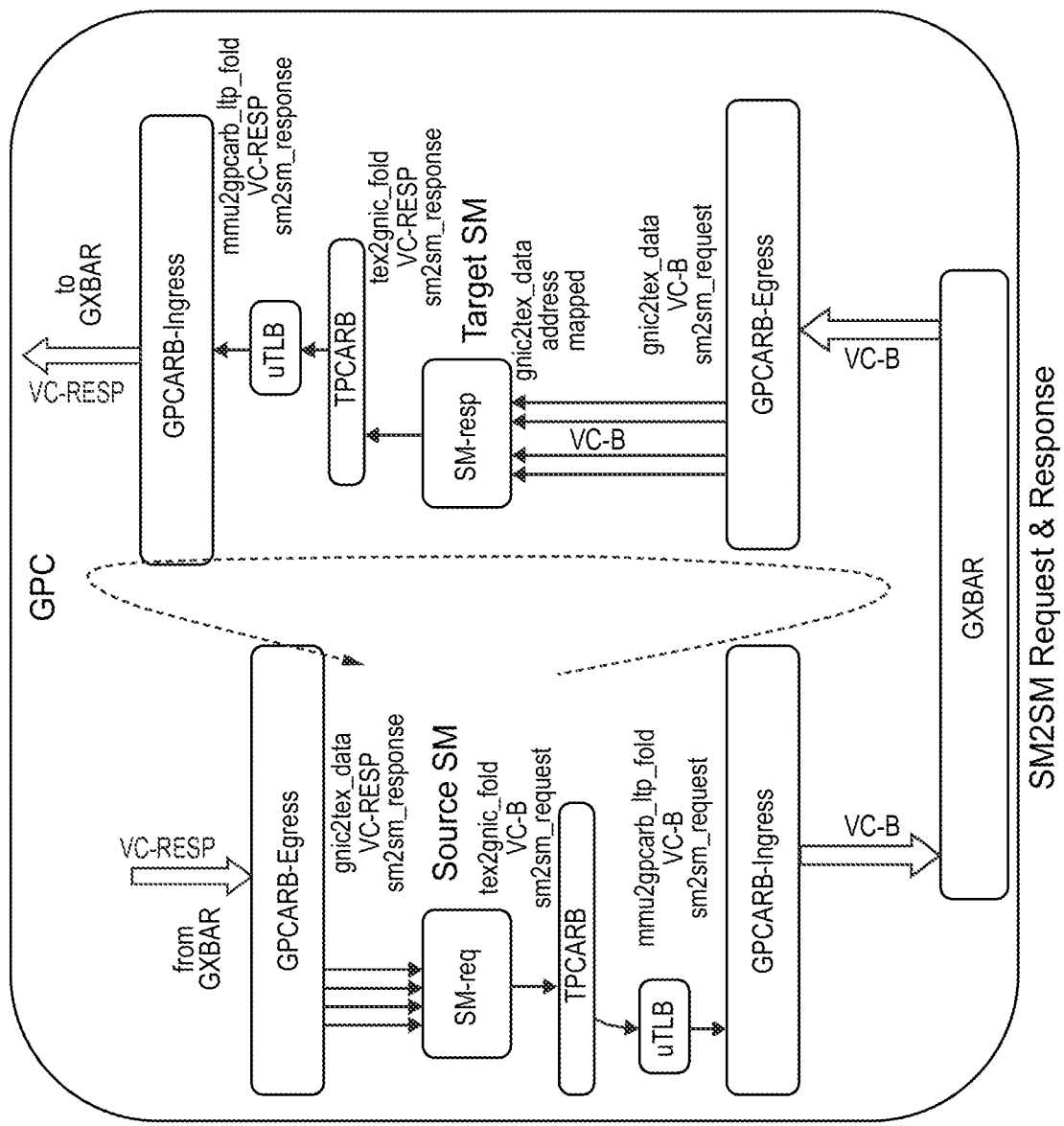

FIG. 2 shows an example GPU environment in which the transaction barrier may be implemented in some embodiments.

The illustrated GPU shows how some GPU implementations may enable plural partitions that operate as micro GPUs such as the shown micro GPU0 and micro GPU1, where each micro GPU includes a portion of the processing resources of the overall GPU. When the GPU is partitioned into two or more separate smaller micro GPUs for access by different clients, resources—including the physical memory devices such as local L2 cache memories—are also typically partitioned. For example, in one design, a first half of the physical memory devices coupled to micro GPU0 may correspond to a first set of memory partition locations and a second half of the physical memory devices coupled to micro GPU1 may correspond to a second set of memory partition locations. Performance resources within the GPU are also partitioned according to the two or more separate smaller processor partitions. The resources may include level two cache (L2) resources and processing resources. One embodiment of such a Multi-Instance GPU ("MIG") feature allows the GPU to be securely partitioned into many separate GPU Instances for CUDA ("Compute Unified Device Architecture") applications, providing multiple users with separate GPU resources to accelerate their respective applications. More particularly, each micro GPU includes a plurality of Graphic Processing Clusters (GPC) each with a plurality of SMs. Each GPC connects to the L2 cache via a crossbar interconnect.

Each GPC includes a plurality of streaming multiprocessors (SM) that are each a massively parallel processor including a plurality of processor cores, register files, and specialized units such as load/store units, texture units, etc. A memory management unit (MMU) in each GPC interconnects the SMs on the same GPC, and also provides each SM with access to the memory including L2 cache and other memory. The GPCs in the same micro GPU are interconnected by a crossbar switch, and the micro-GPUs are interconnected by the respective crossbar switches. The GPU may additionally have copy engines and other 10 units and links for external connections. For more information on prior GPU hardware and how it has advanced, see for example U.S. Pat. Nos. 8,112,614; 7,506,134; 7,836,118; 7,788,468; U.S. Ser. No. 10/909,033; US20140122809; Lindholm et al, "NVIDIA Tesla: A Unified Graphics and Computing Architecture," IEEE Micro (2008); https://docs.nvidia.com/cuda/parallel-thread-execution/index.html (retrieved 2021); Choquette et al, "Volta: Performance and Programmability", IEEE Micro (Volume: 38, Issue: 2, March/April 2018), DOI: 10.1109/MM.2018.022071134.

FIGS. 3A-3D show schematic illustrations of example inter-SM communication within a GPC in an example GPU such as that shown in FIG. 2. Inter-SM communication ("SM2SM" communication) occurs when a first SM transmits a message via a MMU to a crossbar that interconnects all the SMs in the GPC. Memory access requests to the L2 cache, are communicated through the same crossbar interconnect to the L2 cache. In some embodiments, the GPU includes a distributed memory such that inter-SM communication may include data operations from one SM to a portion of another SMs memory. An example distributed memory feature is described in U.S. patent application Ser. No. 17/691,690. One of the messages that an SM can communicate to another SM is the local_cga_id of a CTA the SM is executing (CGA are described below in relation to FIG. 4). In one embodiment, the packet format of such an SM-to-SM message includes a U008 field "gpc_local_cga_id". Each GPC has its own pool of CGA IDs, and GPM allocates one of those numbers to a CGA upon launch of that CGA. This assigned number then serves e.g., as a pointer into the DSMEM distributed memory segments that are being used by the various CTAs in the CGA. In one embodiment, the "gpc_local_cga_id" also serves as the id for tracking barrier state for each GPC_CGA.

Figure 4:
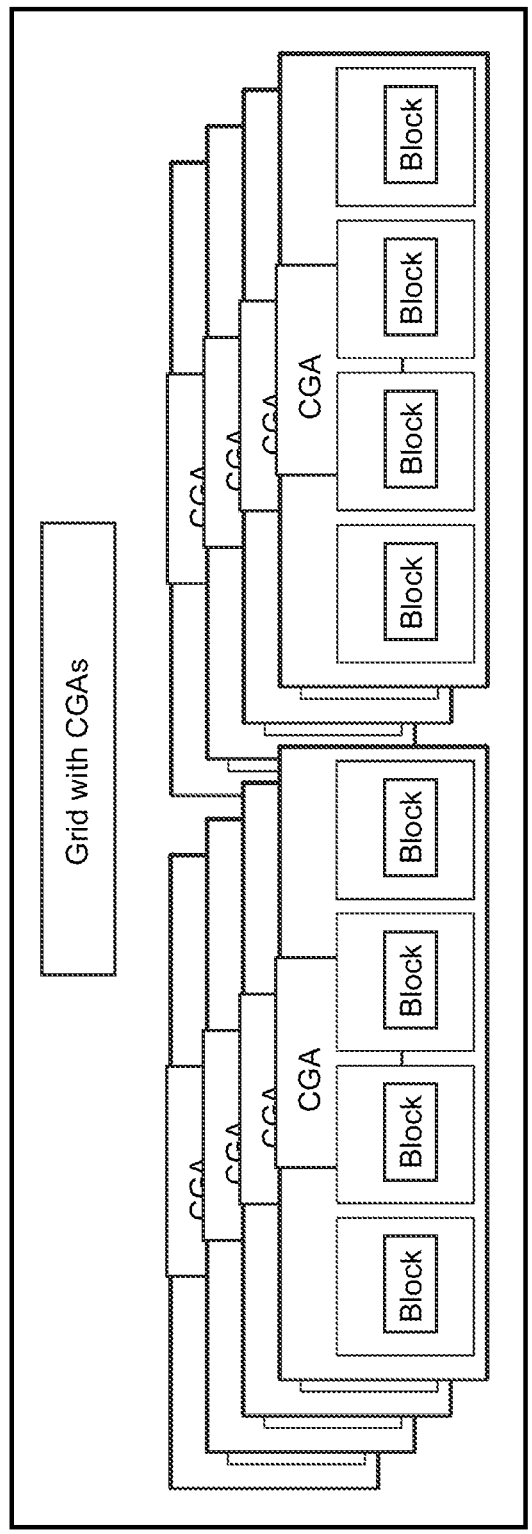
FIG. 4 is a conceptual illustration of a grid of Cooperative Group Arrays (CGAs), each comprising a plurality of thread blocks referred to as cooperative thread arrays (CTAs).

FIG. 4 illustrates an arrangement of blocks of threads in a Cooperative Group Array (CGA), according to some embodiments. A CGA is a new programming/execution model and supporting hardware implementation and is described in the concurrently filed U.S. patent application Ser. No. 17/691,621, which is herein incorporated by reference in its entirety. In some embodiments, the transaction barrier and synchronization unit described in this disclosure rely upon the CGA programming/execution model. The CGA programming/execution model enables adjacent tiles to be launched into SMs on the same GPC.

In one embodiment, a CGA is a collection of CTAs where hardware guarantees that all CTAs of the CGA are launched to the same hardware organization level the CGA specifies or is associated with. The hardware is configured to make sure there are enough processing resources in the target hardware level to launch all CTAs of the CGA before launching any.

As FIG. 4 shows, a CGA is a grid of clusters of thread blocks or CTAs organized as an array. Such CGAs provide co-scheduling, e.g., control over where clusters of CTAs are placed/executed in the GPU, relative to the memory required by an application and relative to each other. This enables applications to see more data locality, reduced latency, and better synchronization between all the threads in tightly cooperating clusters of CTAs.

For example, CGAs let an application take advantage of the hierarchical nature of the interconnect and caching subsystem in modern GPUs and make it easier to scale as chips grow in the future. By exploiting spatial locality, CGAs allow more efficient communication and lower latency data movement. GPU hardware improvements guarantee that threads of plural CTAs the new CGA hierarchical level(s) define will run concurrently for desired spatial localities, by allowing CGAs to control where on the machine the concurrent CTA threads will run relative to one another.

In one embodiment, CGAs are composed of clusters of CTAs that are guaranteed by hardware to launch and execute simultaneously/concurrently. The CTAs in a CGA cluster may—and in the general case will—execute on different SMs within the GPU. Even though the CTAs execute on different SMs, the GPU hardware/system nevertheless provides a cross-SM guarantee that the CTAs in a CGA cluster will be scheduled to execute concurrently. The GPU hardware/system also provides efficient mechanisms by which the concurrently-executing CTAs can communicate with one another. This allows an application to explicitly share data between the CTAs in a CGA cluster and also enables synchronization between the various threads of the CTAs in the CGA cluster.

In example embodiments, the various threads within the CGA cluster can read/write from common shared memory—enabling any thread in the CGA cluster to share data with any other thread in the cluster. Sharing data between CTAs in the CGA cluster saves interconnect and memory bandwidth which is often the performance limiter for an application.

Now, using the concurrent execution and additional shared memory supported by hardware, it is possible to directly share data between threads of one CTA and threads of another CTA—enabling dependencies across CTAs that can bridge hardware (e.g., cross-SM) partitions.

Because CGAs guarantee all their CTAs execute concurrently with a known spatial relationship, other hardware optimizations are possible such as: Multicasting data returned from memory to multiple SMs (CTAs) to save interconnect bandwidth as in embodiments of this disclosure; Direct SM-to-SM communication for lower latency data sharing and improved synchronization between producer and consumer threads in the CGA; Hardware barriers for synchronizing execution across all (or any) threads in a CGA; and more (see copending commonly-assigned patent applications listed above).

The additional cluster overlay provided by the CGA defines where and when the CTAs will run, and in particular, guarantees that all CTAs of a CGA will run concurrently within a common hardware domain that provides dynamic sharing of data, messaging and synchronization between the CTAs.

In example embodiments, all CTA threads within a CGA may reference various types of commonly-accessible shared memory. Hardware support in the GPU allows the different CTAs in a CGA cluster to read and write each other's shared memory. Thus, load, store and atomic memory accesses by a first CTA can target shared memory of a second CTA, where the first and second CTAs are within the same CGA cluster. In some embodiments, the source multicast SM writes to the receiver multicast SMs in their respective memories using a distributed memory mechanism. An example distributed memory that may be used in embodiments is described in U.S. application Ser. No. 17/691,690, which is incorporated herein by reference in its entirety. In some example embodiments, the distributed shared memory of the respective SMs is mapped into generic address space.

Transaction Barrier Data Structure

Figure 5A:
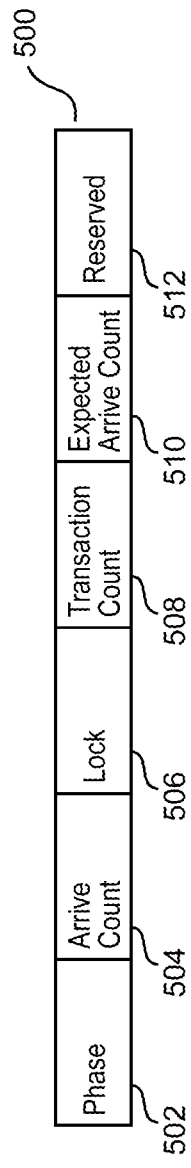
FIG. 5A illustrates a transaction barrier data structure according to some example embodiments.

FIG. 5A shows a data structure for a transaction barrier 500 in accordance with example embodiments. The transaction barrier 500 includes at least a arrive count 504 and a transaction count 508. The arrive count 504 keeps track of arrive operations, and the transaction count 508 keeps track of transactions. Arrives and transactions are further described below. The transaction barrier, when in a state in which the barrier is set so that threads are prevented (i.e. blocked) from progressing in their instruction execution, is cleared only upon both the arrive count 504 and the transaction count 508 satisfy a predetermined clearing condition. The predetermined clearing condition for the barrier, in an embodiment, is an expected number of arrives and an expected number of transaction completions having being reached at the barrier.

Additionally, in some embodiments, the transaction barrier 500 includes one or more other attributes such as a phase indicator 502, an expected arrive count 510, and a lock indicator 506. The phase indicator 502 is used to indicate a phase of the barrier. The value of the expected arrive count 510, which may be the number of arrives expected in each phase, is used to re-initialize the arrive count 504 after the barrier is cleared.

The lock indicator 506 is used in some embodiments to disable updating of the barrier for reasons such as, for example, an error condition being detected subsequent to a thread arrival etc. In example embodiments in which a thread in one SM can operate on another threads' data in another SM, when the remote thread performs an illegal or unpermitted action, the lock indicator can be marked locked. The next time a local barrier operation is attempted, it will be notified to the local thread that the barrier is locked due to an error by the remote thread. This allows for tracking errors that may be caused by any of the many agents using the sync unit to cleanly handle errors.

Figure 5B:
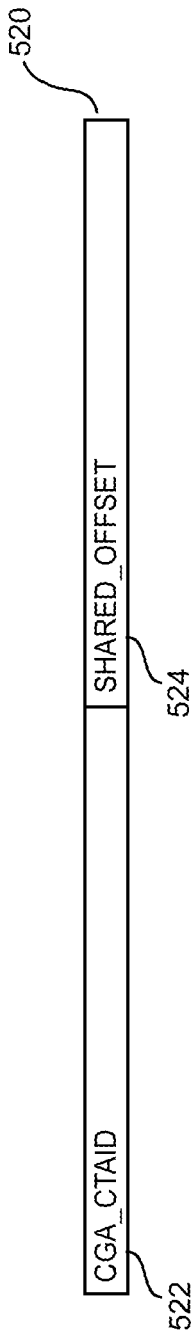
FIG. 5B illustrates an address of a transaction barrier according to some example embodiments.

FIG. 5B shows a transaction barrier 500 address, according to some embodiments. The barrier address 520 includes a unique value 522 that identifies the CGA and the CTAID for which the barrier is created, and a memory offset value 520 that indicates the offset at which the barrier is from the base address in the memory. As described above, in some embodiments, each CGA is allocated its own area in memory, and each CTA of that CGA is allocated its own subarea within the memory block of the CGA. The offset 520 defines the offset from the based address for the particular CTA that creates the transaction barrier 500. In some embodiments, the memory in which the barrier is stored is distributed shared memory that is accessible to all CTAs in the CGA.

Transaction Barrier Operation

Figure 6A:
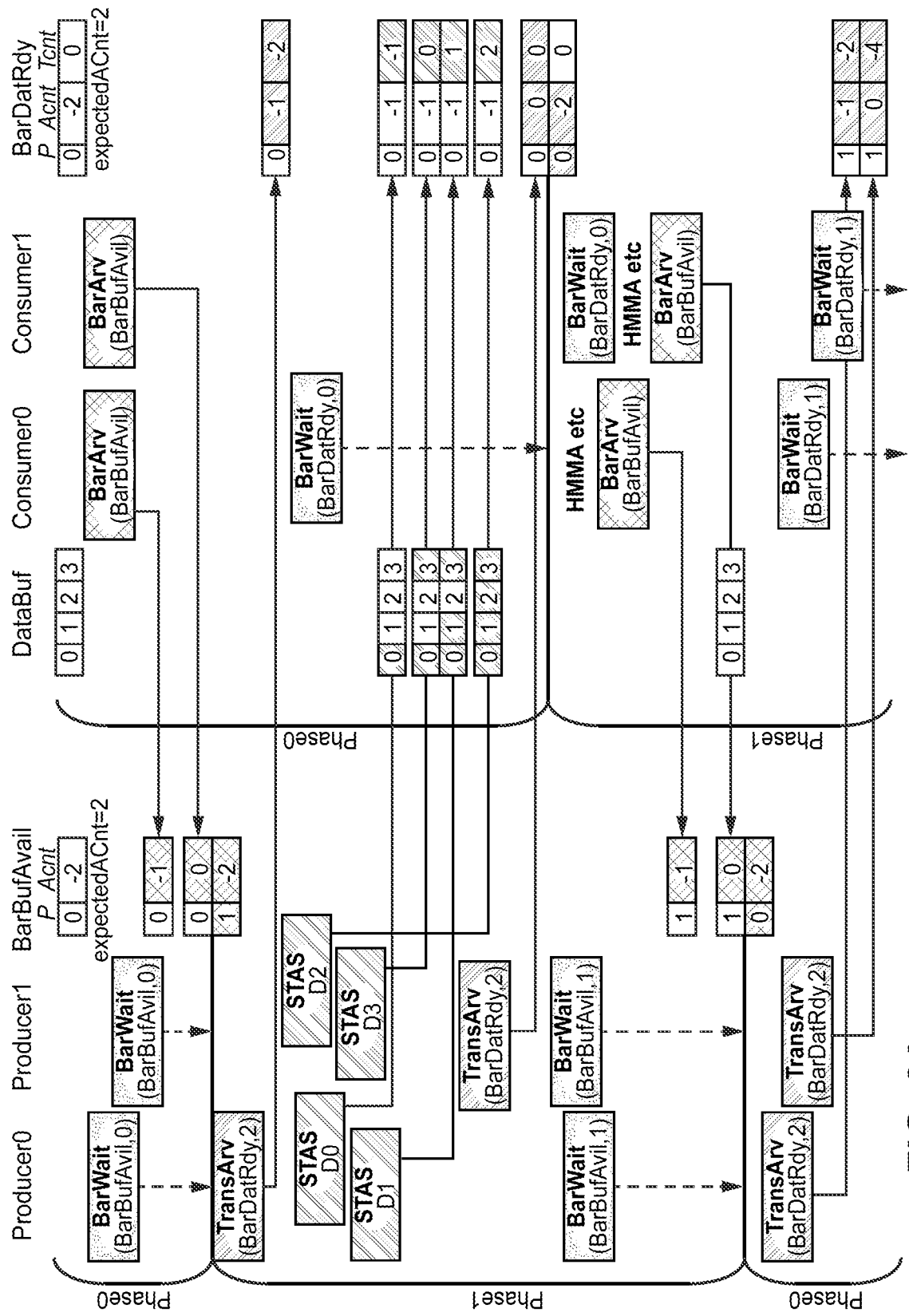
FIG. 6A and FIG. 6B show interactions between producer threads, transactions and user threads being synchronized using a transaction barrier, according to some example embodiments.

FIG. 6A illustrates a transaction barrier use by two producer CTAs ("Producer0" and "Producer1") and two consumer CTAs ("Consumer0" and "Consumer1"). The producers store data into buffer "DataBuf", and the consumers read from DataBuf. Producer0, Producer1, Consumer0 and Consumer1 may each be a thread in a respective CTA in the same CGA. The CTAs may be on the same SM or on two or more SMs.

The illustrated producer-consumer interaction involves the two producers utilizing an arrive-wait barrier shown in the figure as "BarBufAvail" to determine the availability of space in a buffer "DataBuf" in which to store data produced by the producers, and the two consumers utilizing a transaction barrier shown in the figure as "BarDatRdy" to determine the availability of data in DataBuf to consume.

The barriers define two phases "Phase0" and "Phase1", and each barrier starts in phase 0 at the beginning of the interaction.

The arrive-wait-barrier is initialized to phase 0 and arrival count −2 (P=0, Acnt=−2). The arrival count, while representing the number of expected thread arrivals at the arrive-wait barrier during phase 0, is initialized to the negative value of the actual number of expected thread arrivals (e.g., −2 to represent an expected number of 2 thread arrivals) at the arrive-wait barrier. In this manner, in response to each thread arrival at barrier BarBufAvail, the arrival count can be updated by an increment operation (e.g., increase arrival count by 1).

The transaction barrier is initialized to phase 0, arrival count −2 and a transaction count 0 (P=0, Acnt=−2 and Tcnt=0). The initialized arrival count represents that two thread arrivals are expected at the transaction barrier in phase 0, and the transaction count represents a count of the data to be received also in the same phase.

In the example, the transaction count represents a number of buffers expected to be exchanged between the producers and consumers. In example embodiments, in each phase, each transaction arrival updates the transaction counter with the number of expected transactions.

After the barriers are initialized, Producer0 and Producer1 threads wait on the arrive-wait barrier BarBufAvail, in phase 0, because DataBuf is full and has no space in which to store further data from the producers. Consumer0 and Consumer1 each reads respective buffers of DataBuf and updates the BarBufAvail barrier to indicate that some of the data in DataBuf has been consumed, by each incrementing the arrive count on BarBufAvail as a result of calling a thread arrive( ) function. When the arrive count on the BarBufAvail indicates that all the expected arrives have been received (i.e., Acnt=0), the BarBufAvail barrier is cleared, and BarBufAvail barrier moves to the next phase—phase 1.

The move to phase 1 from phase 0, sets the phase count of the BarBufAvail barrier to 1 and reinitializes the expected arrive count (i.e. P=1, Anct=−2). Note that the BarDatRdy barrier is still in its phase 0.

Since the BarBufAvail barrier is cleared (indicating that buffers are available), the producer threads can proceed. As shown, Producer0 proceeds to call a transaction arrive( ) function, thereafter store data to two DataBuf buffers D0 and D1, and then wait on BarBufAvail. Producer1 proceeds to first store data to two DataBuf buffers D2 and D3, thereafter call a transaction arrive( ) function (or generating an arrive packet by another means, and sending to the synchronization unit), and then wait on BarBufAvail. Each producer thread may wait on BarBufAvail by calling a thread wait( ) indicating the barrier and the current phase.

Each transaction arrive( ) called by the producer threads, in addition to updating the arrive count "Acnt", also updates the transaction count in the BarDatRdy transaction barrier to indicate how much data (in this example, how many buffers in DataBuf) it will be storing. In this example, such updating is accomplished by decrementing the transaction count "Tcnt": Producer0 and Producer1 each calls a transaction arrive( ) indicating a store of 2 buffers.

As illustrated, each store performed by the producer threads to store D0-D3 to DataBuf increments the transaction count (Tcnt) by the number of buffers stored. Thus, it can be seen that the transaction arrive( ) of Producer0 updated Tcnt to −2 indicating that it will be storing two buffers, and that each subsequent store operation incremented Tcnt by 1 so that Tcnt=2 at which point Producer1's transaction arrive( ) decremented Tcnt by the number of buffers written by Producer1. This sequence illustrates that the respective threads can call transaction arrive( ) before or after the corresponding store operations. The arrive( ) operations are called by the threads, and the store operations are transactions that may be performed by hardware units, such as, for example, a DMA copy engine, the TMA unit, etc.

When, in phase 0, the BarDatRdy transaction barrier arrive count is 0 and the transaction count is 0 (Acnt=0, Tcnt=0) indicating that the expected number of thread arrives have arrived and the expected number of transactions have completed, the BarDatRdy barrier is cleared and moves into phase 1 reinitializing the barrier to P=0, Acnt=−2, and Tcnt=0.

The clearing of BarDatRdy allows any threads waiting on it to proceed. Note that, according to the illustrated scenario, only Producer® is waiting (e.g. has already called transaction wait( )) on BarDatRdy, and Producer1 happens to call transaction wait on BarDatRdy in phase 0 only after BarDatRdy is already cleared in phase 0. Thus, while Producer0 is initially blocked by BarDatRdy, Producer1 passes through BarDatRdy without blocking because the barrier is already cleared when Producer1 makes its wait( ) call. In either case, after the BarDatRdy barrier phase 0 is cleared and after its respective transaction barrier wait( ) in phase 0, each consumer thread consumes the data in DataBuf, optionally performs any processing using the data (in this example, HMMA etc.) and calls thread arrive( ) on BarBufAvail which is in phase 1 thereby updating the arrive count in BarBufAvail. The consumer threads then wait on BarDatRdy in phase 1 for data to be available again.

When BarBufAvail is phase 1 (P=1) and Acnt reaches 0, it is cleared (and reinitialized to phase 0 and initial expected arrive count; P=0 and Acnt=−2) and Producer0 and Producer1 waiting on it are allowed to proceed. The producer threads, now operating while the BarBufAvail barrier is in phase 0, each calls transaction arrive( ) on BarDatRdy indicating the number of buffers (in this example, 2) that each expects to store. Although further interactions are not illustrated, it will be understood that the producer threads and consumer threads can interact to safely use the data in the buffer.

Transaction barriers may use phase toggle (i.e., indicating phase0 or phase 1 by toggling the phase counter attribute of the transaction barrier between 0 and 1) to indicate barrier clear. In some embodiments, to make it easier for software to track the phase, the arrive( ) operation will return the old phase to be used in a wait( ) operation. This works well for traditional bulk-sync scenario in which each thread will do the arrive first and the wait later. However for producer—consumer scenarios, the phase returned by arrive( ) could be useless if it was done in producer that does not call a wait( ) (the hardware design is flexible on who does the arrive( )). And on the other hand, wait( ) on consumer side still may require a phase to correctly operate.

Figure 6B:
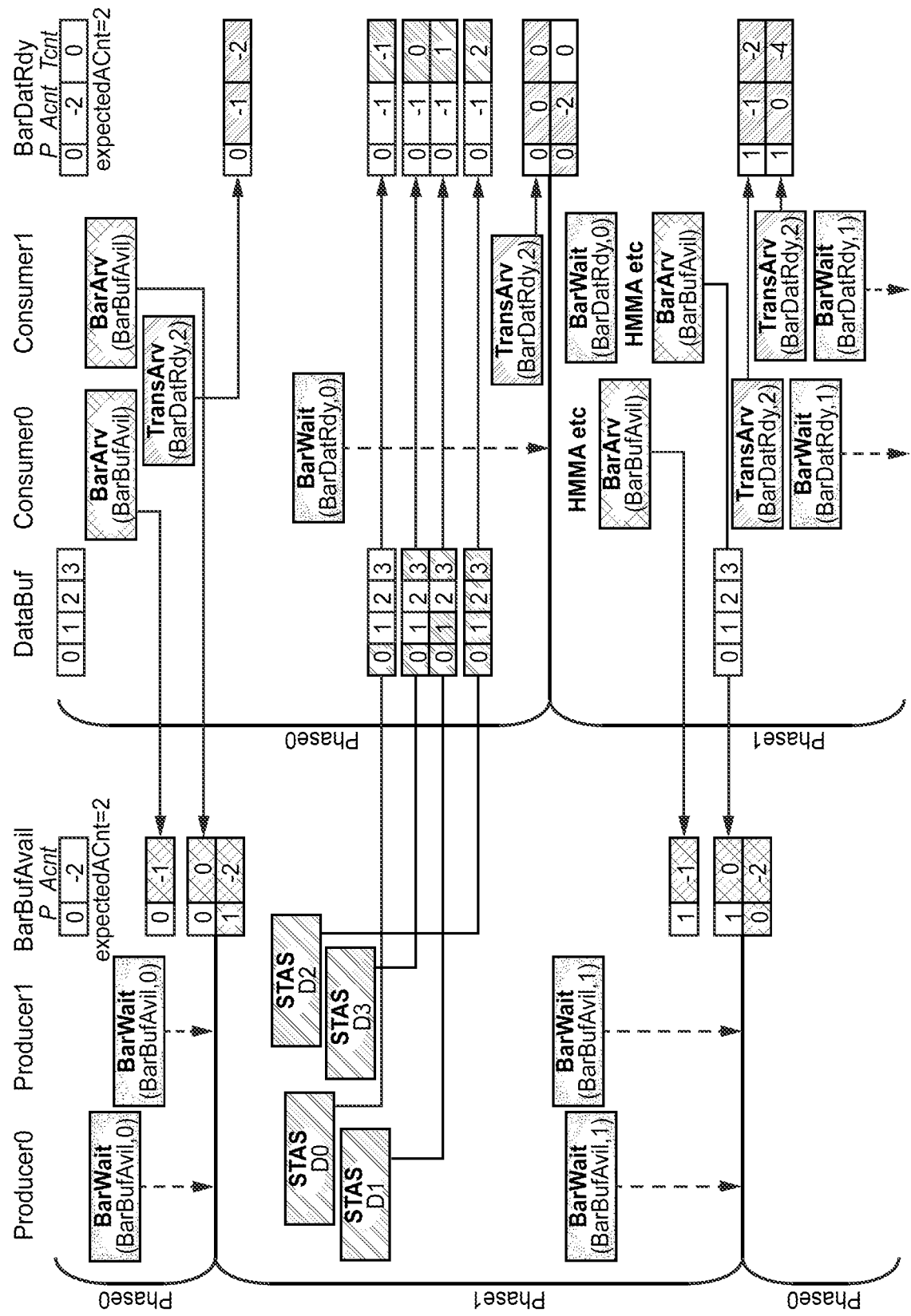

FIG. 6B shows an interaction identical to that of FIG. 6A, except that the transaction arrive( ) is issued by each of the consumer threads in between their respective barrier arrive( ) and barrier wait( ) calls made by each of them. Thus, FIG. 6B may be described as an example producer-consumer interaction where the consumer threads control the transaction barrier since the transaction arrive( ) is issued by the consumer threads in contrast to FIG. 6A where the transaction arrive( ) is issued by the producer threads. In the illustrates examples, control of the transaction barrier by the consumer may be more efficient since the barrier is local to the consumer.

Note that in the interactions shown in FIGS. 6A and 6B, the arrive events of threads and transactions both contribute to the clearing of the transaction barrier by incrementing the arrive count, but the transaction arrive also sets the expected transaction count. Since hardware transactions such as, for example, data movement by copy engines, TMA unit operations to move data blocks or multicast data etc., are typically not constrained to wait on other resources, in some embodiments, the programming model may not permit a hardware unit (e.g., such as a copy engine, TMA unit etc.) to utilize the barrier to wait for a resource (e.g., buffers to store data), and may rely on the threads to ensure the availability of the resource before a hardware unit is invoked to use the resource.

Hardware-Implemented Synchronization Unit

Figure 7:
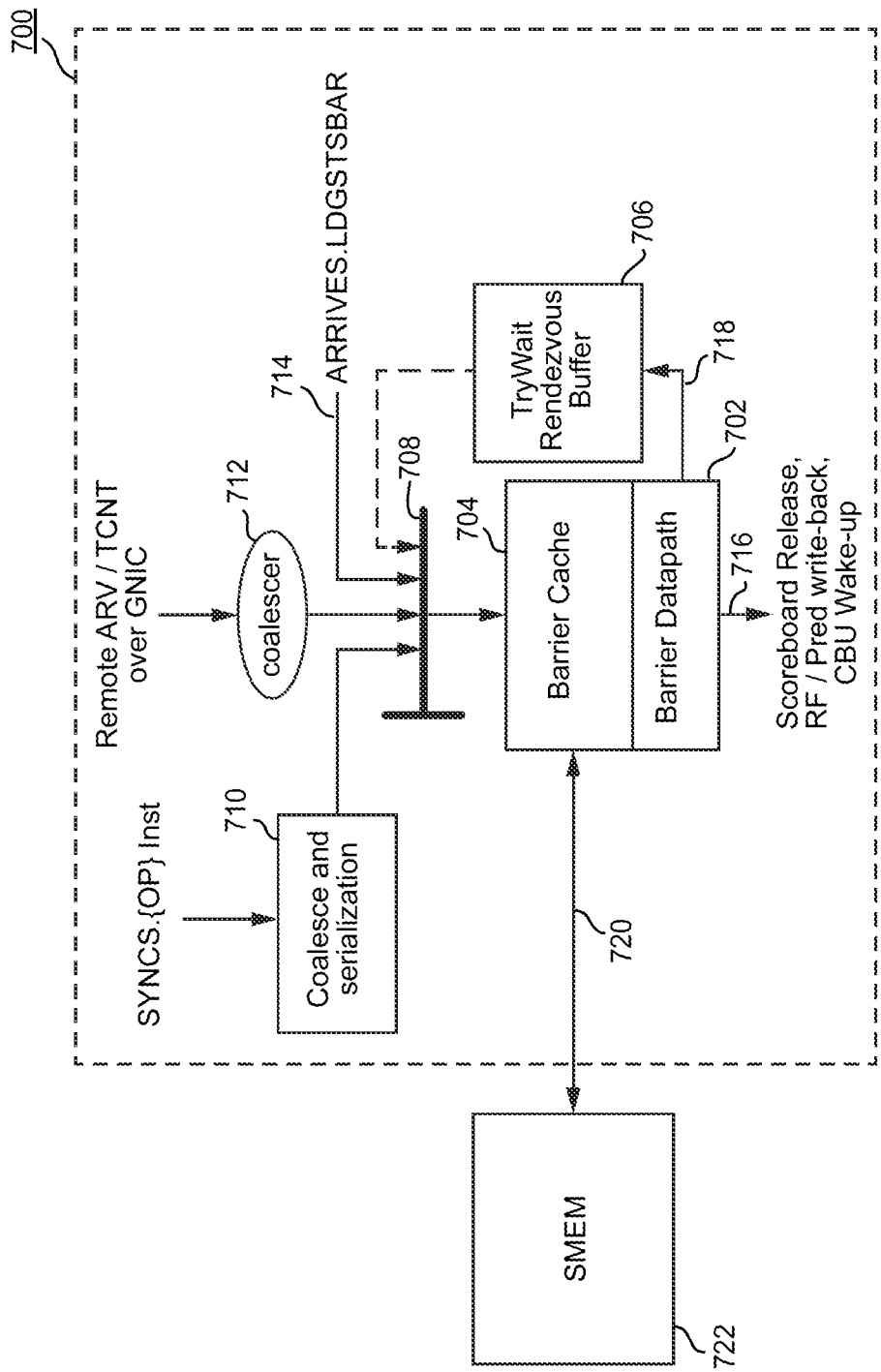
FIG. 7 is a schematic block diagram of a hardware-implemented synchronization unit in accordance with some example embodiments.

FIG. 7 schematically illustrates an example synchronization unit, also referred to herein sometimes as a "SYNCS" unit, that is implemented as a hardware circuit in accordance with some embodiments. In some embodiments, the synchronization unit 700 provides hardware acceleration to the transaction barrier 500. For example, some or all operations that are required for the creation and maintenance of a transaction barrier 500 in a shared memory 722 can be accelerated by hardware in the form of the synchronization unit 700.

The synchronization unit 700 includes a barrier datapath circuit 702. A barrier cache 704 attached to the datapath circuit 702 is configured to store cached versions of a plurality of transaction barriers 500 that are stored in shared memory 722 that is communicatively connected to the cache 704 via an interface 720. The barrier cache 704, in a non-limiting embodiment, has four 257-bit cache lines and is a fully associative non-coherent cache. Although memory 722 connected to interface 720 is shared memory in the illustrated example, the memory can be or may include another memory such as, for example, another cache memory, linear memory, distributed or non-distributed shared memory, or global memory, in some other embodiments of this disclosure.

In an embodiment, each entry in barrier cache 704 includes a tag which has a value that is derived from the memory address (e.g. address in the shared memory backing store) of the barrier stored in the entry. Each entry may also include one or more valid bits. When a thread arrive or transaction update operation is received, the barrier datapath 702 performs a tag check in barrier cache 704 to determine whether the associated barrier is in the barrier cache 704. If the associated barrier is in the barrier cache 704 (i.e., a cache hit occurs), the arrive and/or transaction counts of the barrier in the barrier cache 704 is updated. If the associated barrier is not in the barrier cache 704 (i.e., a cache miss occurs), the barrier is read from the backing memory and written to the barrier cache 704. If the barrier cache 704 is full, an entry can be evicted by writing the associated barrier to backing memory. When a barrier is evicted from the barrier cache 704, some cached information, such as, for example, information as to what threads are waiting on that barrier, may be discarded.

In some example embodiments, the barrier cache is a write-back cache which is non-coherent with the shared memory back storage. Thus, at times, the cached barrier, or more specifically the cached barrier data structure stored in the cache 704, may contain state different from the shadowed copy backed in shared memory. In example embodiments, it may be the software's responsibility to avoid mixing of barrier operations based on the potentially different states stored in the cache 704 and shared memory operations to the same barrier address without explicit coherency and ordering operation in order to avoid unpredictable results. In other embodiments, hardware is used to prevent such mixing of barrier operations.

The synchronization unit may be configured to trigger a flash-clean of the barrier cache upon CTA-exit, and thereby ensure that no stale lines from previous CTAs can exist in the barrier cache when a new CTA is launched recycling those used memory spaces. As a result, software may not be required to concern itself about dirty lines from previous CTAs corrupting useful data upon cache eviction. However, the tag can remain valid in the cache which means that software may need to follow coherency rules at the very beginning of the CTA launch. In some embodiments, the synchronization unit may trigger a barrier cache write-back at a selected time to free the users from being responsible on the silent data corruption prevention. In some embodiments, the barrier cache 704 supports an invalidate operation which clears the valid bit of a matching cache entry. This operation can be issued by a thread or initiated on a CTA launch. In some embodiments hardware-based cache coherence measures such as monitoring load and store operations to the memory, clearing the valid bit in response to matching stores, and/or updating the entry in response to matching stores, and/or supplying data to matching loads may be implemented.

The barrier datapath circuit 702 may include hardware circuitry to perform operations such as updating one or more attributes such as arrival count, transaction count, phase count, lock, etc., and/or the resetting/reinitializing of cached transaction barrier objects 500 that may be in the cache 704 with a shadow copy stored in memory 722. In some embodiments, the datapath circuit 702 may be able to perform all updates on a transaction barrier 500 in response for a thread arrive( ), thread wait( ), transaction arrive( ) or a transaction such as a data store operation at the rate, for example, of 1 barrier operation per clock per SM. The datapath circuit 702 may, through one or more interfaces 716, signal other hardware units (e.g., scoreboard, CBU, etc.) to perform operations such as scoreboard release, register file update, predicate write-back, and CBU wake up.

In some embodiments, the datapath circuit 702 is connected to a buffer 706 that is sometimes referred to herein as a "try-wait buffer" or "try-wait rendezvous buffer". The buffer 706 is configured to store information regarding one or more threads that are waiting on any of the transaction barriers. In an example embodiment, upon a thread calling thread wait( ) on a transaction barrier that is not yet cleared, that thread will be added to the try-wait buffer 706 by the datapath circuit 702 over connection 718. In some embodiments, the try-wait buffer can store 32 entries with each entry corresponding to information regarding a respective waiting thread. The buffer 706 may be a content addressable memory (CAM) storing the information regarding the one or more threads. The CAM may be accessible based on the transaction barrier address and/or thread identifier.

When a transaction barrier 500 in the cache 704 clears, the datapath circuit 702 notifies all threads waiting (i.e. blocked) on that transaction barrier 500 in the try-wait buffer 706. These threads may be executing on the same SM, or on different SMs, or on both the same SM and different SMs. Upon being notified, the waiting threads may each reissue the thread wait( ) and, the barrier having already been cleared, proceed in its execution. In some embodiments, the waiting threads may, when notified, proceed to continuing with their respective executions without reissuing the thread wait( ). In some embodiments, the try-wait buffer may include, or may be associated with, a timer to clock timeout of respective waiting threads. A decoupled approach to timer tick evaluation and retry may be used. The tick loop picks up timeout entries from buffer to retry, whereas the retry loop could be triggered by either timeout or a barrier clear. This may be considered a lazy retry mode which only has timeout entries to retry when retry is triggered by timeout.

In some embodiments, CBU integration is made to make the synchronization unit's wait( ) operation efficient in the presence of divergence. The idea is to let the synchronization unit handle convergent waiting through a scoreboard, while letting the CBU handle divergence waiting. The same CBU interaction mechanism may also be used in convergent cases to handle corner case sync failure like try-wait buffer being full.

By enabling, in the manner described, for waiting threads to be stored in a buffer that is closely coupled to the datapath circuit, and providing for notification of barrier clears to the threads stored in the buffer, the synchronization unit enables the elimination or at least a drastic reduction in the overhead associated with the retry loop typically associated with threads waiting on a barrier.

The transaction barrier will track the number of transactions in addition to the arrives to match an expectation before declaring barrier clear. The transaction traffic can be high and may steal a substantial amount of memory input/output bandwidth. Therefore, the synchronization unit also includes a coalescing circuit that coalesces the transactions update to minimize the bandwidth tax. The synchronization unit 700 may further include a multiplexer circuit 708 that serializes instructions and commands that are incoming to the barrier datapath circuit 702 from the try-wait buffer 706, arriving load/store transactions (e.g., LDGSTBAR) operations 714, remote arrivals, and transaction updates received over GNIC via a coalescer circuit 712 and SYNCS.{OP}Inst via a coalescing and serializing circuit 710. Coalescer circuit 712 may, in some embodiments, coalesce multiple instructions to the same transaction barrier into one instruction. Arrives and transactions that come from other SMs either by themselves or as part of stores (STAs). Both local and remote TMA unit loads may appear to be STAs from the synchronization unit point of view.

The barrier cache serves as a traffic filter to memory back-store since the barrier traffic can be intensive. In example embodiments, only barrier cache miss and eviction traffic are made visible to memory (such as the shared memory in the example). The wait( ) operation on a non-cleared barrier will result in an insertion operation to the try-wait buffer, and optionally trigger eviction and failure return. In example embodiments, the respective instruction set architecture to define if the try-wait buffer is retry based (loop between tracker and datapath circuit), bar-clear trigger based (the try-wait buffer tracker being a CAM waiting for output from datapath circuit) or even mixed (imprecise wakeup trigger retry loop).

The synchronization unit 700 is not limited to providing hardware acceleration to transaction barriers. For example, in some embodiments, the synchronization unit 700 may provide hardware acceleration to arrive-wait barriers by, for example, caching the arrive-wait barriers in the barrier cache, providing the datapath circuit for processing arrive( ) and wait( ) on the arrive-wait barriers, and by providing for the threads waiting on the arrive-wait barrier to utilize the try-wait barrier. In an example embodiment, the producer will perform a sequence wait(barrier0)=>data store=>fence( )=>arrive(barrier1), while the consumer will perform the sequence arrive(barrier0)=>other operations=>wait(barrier1)=>consume stored data, in which at least the wait( ) may use the try-wait buffer thereby reducing the polling of the barrier1 is reduced.

Figure 8:
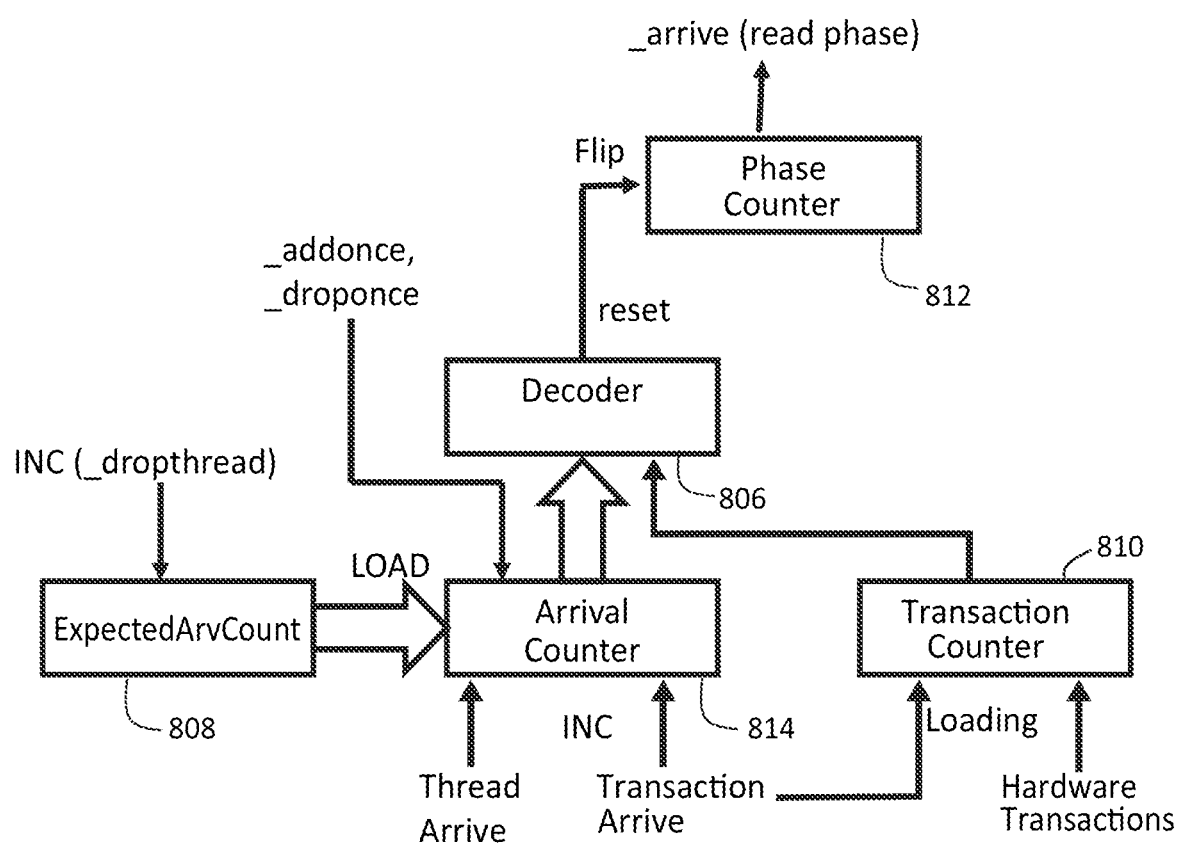
FIG. 8 is a block diagram of an example non-limiting combination of hardware and software functions that can be used to manage the transaction barrier of FIG. 5A with hardware acceleration provided by the synchronization unit shown in FIG. 7, according to some embodiments.

FIG. 8 is a block diagram of an example non-limiting memory-backed implementation of the FIG. 5 transaction barrier 500 with hardware-acceleration by the synchronization unit 700. As discussed above, barrier instructions such as instructions for transaction barrier creation, transaction arrive( ) function, transaction barrier wait( ) function, etc. (see, e.g., SYNCS.{OP} inst etc. received through coalescing and serializing circuit 710 in FIG. 7) can be performed by the barrier datapath circuitry 702 on the cached version, resident in the barrier cache 704, of the transaction barrier 500 that is stored in a memory such as, for example, shared memory 722.

The phase counter 812, arrive counter 814, expected number of arrivals 808 and the transaction counter 810 are stored in the cache 704 as attributes of the cached transaction barrier 500, and are accessible by the datapath circuit 702 which in example embodiments is able to perform operations to change the value of attributes of the transaction barrier 500 in the cache 704. The datapath circuit operates on serialized instructions, and thus can operate on the transaction barrier without additional protections. The datapath circuit can modify the arrive counter 814 and transaction counter 810. The arrive counter is incremented in response to thread arrives and transaction arrives. The transaction counter 810 is decremented when an expected transaction count is provided by a transaction arrive and is incremented responsive to transaction arrive messages or other hardware unit generated messages informing of a transaction count. The datapath circuit also can reset the synchronization primitive 500 if the modifying causes the arrival counter decoder 806 (which functions as a comparator that compares the counts of the arrive counter 814 and transaction counter 810 with predetermined values (e.g., 0) and resets the counters and the phase indicator based on results of the comparison) to determine that no more threads or transactions are awaited before the transaction barrier can reset. In such instance, the decoder 806 initiates a hardware-controlled reset of the transaction barrier 500 instance to "flip" the phase indicator 812, reload the expected number of arrives 808 into the arrive counter 814, and reset the transaction count 810 to an initializing value (e.g., 0). In some embodiments, the transaction barrier 500 may include an expected transaction count as another attribute. The expected transaction count attribute, in such embodiments, specifies an initial number of transactions with which the transaction counter 810 is initialized in each phase.

In example non-limiting embodiments, the processor architecture may be modified to provide additional circuitry that ties hardware-based processes such as DMA, TMA unit, Multicast and other hardware units that provide data movement etc., into the synchronization barrier implementation in the synchronization unit 700. Each of such hardware units may be configured to, associated with each store operation, transmit an update message to the synchronization unit 700 indicating the transaction barrier address and the transaction count associated with the store operation (e.g., number of bytes written by the store operation). The thread that makes the call to the hardware unit to cause the store operation may provide the hardware unit with the barrier address. The synchronization unit 700, or more particularly the coalescing units 710 and/or 712, may coalesce update messages to the same barrier and synthesize one or more instructions that are then provided to the datapath circuit 702 through the multiplexer 708. The TMA unit, for example, may generate and transmit such messages to the synchronization unit 700 for each data store operation completed. In another example, the synchronization unit 700 at the multiplexor 708 receives instructions such as ARRIVES.LDGSTSBAR from a DMA/copy engine signaling that all DMA transfers from a particular thread have completed, and updates the arrive count and/or the transaction count in the transaction barrier accordingly. The instruction may cause the datapath circuit to process an arrive (see FIG. 9B) in which one of the input parameters include the transaction count specified by the hardware unit.

Example Instruction Set Architecture Implementation

Example non-limiting embodiments herein implement an Instruction Set Architecture (ISA) to include instructions for accessing the new transaction barrier synchronization primitive. In example non-limiting implementations, as with the arrive-wait barrier, a thread will typically include two different primitive calls: an "arrive" primitive call to the barrier, and a "wait" primitive call to the barrier. Between those two calls, as described above and shown in FIGS. 6A and 6B, the thread may include instructions unrelated to the barrier that can be executed without violating the barrier.

As described above various embodiments may utilize the transaction barrier 500 with or without hardware-acceleration provided by the synchronization units. Accordingly, in some embodiments, during initialization, the system will initially set up the synchronization barrier instance in memory (e.g., shared memory or global memory) and store the appropriate data there that the system needs to retain in order to implement the barrier (e.g., updating of arrive count, transaction count, phase count, expected arrive count, lock). Typically, a SDK (software development kit) provided by the system designer may include a library including these various function calls to initiate a synchronization barrier. Similarly, the ISA of the processing system may include instructions for the transaction barrier create( ), the transaction barrier arrive( ) and transaction barrier wait( ). Atomic operations (stored in a processor instruction register and decoded by an instruction decoder) such as arithmetic functions (such as atomicAdd( ), atomicSub( ), atomicExch( ), atomicMin( ), atomicMax( ), atomicInc( ), atomicDec( ), atomicCAS( )), bitwise functions (such as atomicAnd( ), atomicOr( ), atomicXor( )), and other functions allow a SM to change the value of the transaction barrier 500 "in place" in the memory.

One or more additional functions too may be provided for managing the transaction barriers. For example, some embodiments may include a_dropthread function that permanently removes a thread from an transaction barrier (such as when a thread exits), an_addonce function that adds to the count of an transaction barrier by a specific amount, and a_droponce function that reduces the count of an transaction barrier by a specific amount. These may be similar to the corresponding functions described in U.S. Ser. No. 16/712,236 (which is already incorporated by reference).

In some other example non-limiting embodiments, in which transaction barrier operations are accelerated by a synchronization unit 700, one or more of the transaction barrier create( ), transaction barrier arrive( ) and transaction barrier wait( ) (and possibly other defined transaction barrier functions) cause the synchronization circuit to operate on the synchronization barrier 500 in the barrier cache 704. In one example non-limiting embodiment, the following software functions may be used to manage an transaction barrier 500 instance stored in the barrier cache 704:

a create( ) function 900 (see FIG. 9A) is used to setup an transaction barrier;

an arrive( ) function 920 (see FIG. 9B) is used by a thread to indicate its arrival at an transaction barrier, and the barrier phase may be returned by this function for use in the wait( ) function; and a wait( ) function 950 (see FIG. 9C) is used to wait for an transaction barrier to clear for the specified phase.

Both the memory order semantics associated with the arrive-wait barrier and new object fence semantics may be relevant to the synchronization unit in some example embodiments. In the arrive-wait barrier, an arrive( ) and a wait( ) are used to provide a split barrier where a memory model release and acquire are separated. A split barrier can be described as for an instruction sequence of "<PRE>=>arrive(barrier)=><MIDDLE>=>wait (barrier)=><POST>": a thread's<PRE>load/stores are guaranteed visible to other participating thread's<POST>load/stores; a thread's<POST>load/stores are guaranteed not visible to other participating thread's<PRE>load/stores; and a thread's <MIDDLE>load/stores have no visibility guarantee ordering to other threads (at least not any visibility guarantees provided by this particular barrier).

The arrive(barrier) and wait(barrier) have memory model release and acquire semantics respectively. In some implementations, the atomic arrive (e.g., ATOM.ARRIVE) instruction does not have guaranteed ordering with <PRE> load/store and requires a memory barrier (e.g., MEMBAR) instruction to guarantee that ordering. This is unlike some hardware named barrier (e.g., BAR. SYNC) instructions in which the implementation has a built in ordering guarantee and does not require an explicit additional memory barrier instruction.

With respect to the transaction barrier, the instructions used to implement the arrive(barrier) and wait(barrier) functions of a split barrier, when used together do provide an ordering guarantee of <PRE>load/store for thread synchronization at CTA scope without needing an explicit additional memory barrier instruction. Synchronization at greater then CTA scope may, however, require an additional memory barrier.

For the transaction barrier, in some embodiments, the transaction(barrier) operation carried by a single data transaction follows the object fence semantics. Object fence semantics means that only the load/store for that transaction has guaranteed visibility (ordered before the corresponding transaction update to the barrier), and no other visibility barrier can be stored to shared memory or in any desired memory in the memory hierarchy consistent with the scope of synchronization.

In an example embodiment, the logic similar to the following may be implemented in the barrier datapath 700 for the _create( ):

```
Int_Create(barSPtr, expectedArv, size) {
    memset(barSPtr, 0, size);
    TransactionBarState_t *trans= (TransactionBarState_t *) barSPtr;
    trans->expectedArv = -expectedArv; //'Negative unsigned number', implicit signed bit
    trans->arvCnt = -expectedArv;
    return trans->phase;
}.
``` ordering is guaranteed. At the implementation level, this object fence ordering guarantee may be provided without needing any explicit additional memory barrier instructions.

A CTA-wide fence is used in some embodiments to order instructions for the transaction barrier. This enables a single fence to orders the entire SM, instead of each thread injecting its own fence. The CTA-wide fence can be generated by synchronization unit hardware at the clearing of a transaction barrier.

The synchronization unit hardware may generate a flushing operation in order to guarantee visibility of all previous issued transaction barrier instructions before any following load/store or transaction instructions. A thread-wise memory barrier may be used for this purpose together with the flushing operation to extend the visibility beyond the flushing point. In some embodiments, a scoreboard is used to serve the purpose of the flushing operation. All transaction barrier instructions can release write scoreboards, including those that do not write back any results.

Figure 9A:
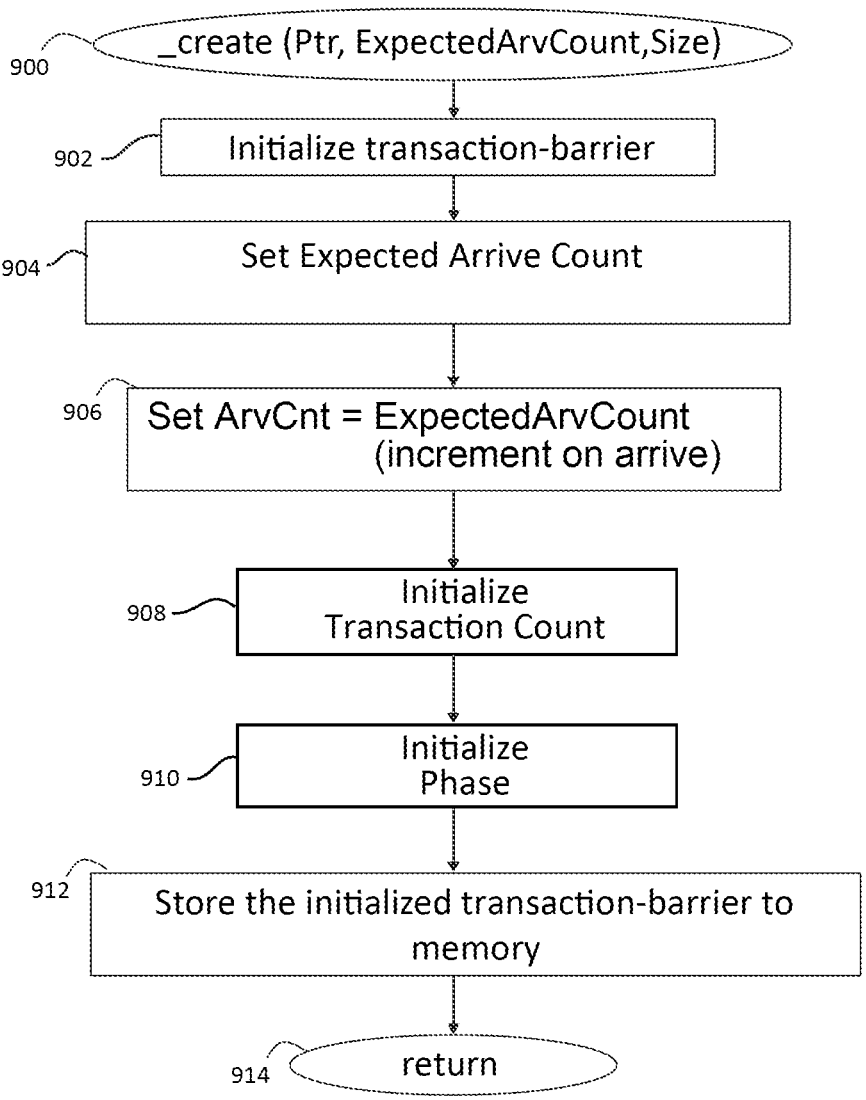
FIGS. 9A-9C are flow charts of instruction logic used in implementing functions associated with the transaction barrier of FIG. 5A with hardware acceleration provided by the synchronization unit shown in FIG. 7, according to some embodiments.

FIG. 9A shows an example_create( ) function 900 that sets up a new transaction barrier. In this example, the invoking code is responsible for invoking create( ) in only one thread. The create( ) function 900 takes as input parameters "Ptr" (the direct or indirect memory location where the barrier data structure is to be stored in memory) and "ExpectedArvCount" (the expected total number of the collection of threads and hardware transactions that are synchronized by this particular barrier). In the example shown, the transaction barrier data structure memory is initialized (902). For example, a memory block of a particular size (which may be specified as an input parameter to create( ) or predefined) at the memory location defined by Ptr may be initialized to 0. The expected arrive count attribute of the transaction barrier is set to ExpectedArvCount (904), and the arrive counter of the transaction barrier is set to ExpectedArvCount (to be increment on respective arrive( )) (906). As noted above, the expected arrive count attribute of the transaction barrier is used to reinitialize the arrive count attribute when the phase of the barrier changes, and the arrive counter is reinitialized with the negative of the expected arrive counter so that subsequent arrive( ) operations can simply increment the arrive counter towards 0. The transaction count and phase count attributes are initialized to predetermined values (steps 908 and 910), and the now-initialized transaction barrier is stored to the specified location in memory (912). The predetermined values for transaction count and phase count may be 0 in some example embodiments. The function then returns (914), and in some embodiments, may return a value such as the phase counter value. As described above, in example embodiments the In some example embodiments, although the synchronization unit 700 supports the_create( ) function described above, hardware does not fully mitigate the software burden on creating the transaction barrier in the memory. Software may still need to enforce synchronization before using this hardware feature. Otherwise, there is risk of racing condition on the barrier creation (e.g. creating the barrier multiple times).

Figure 9B:
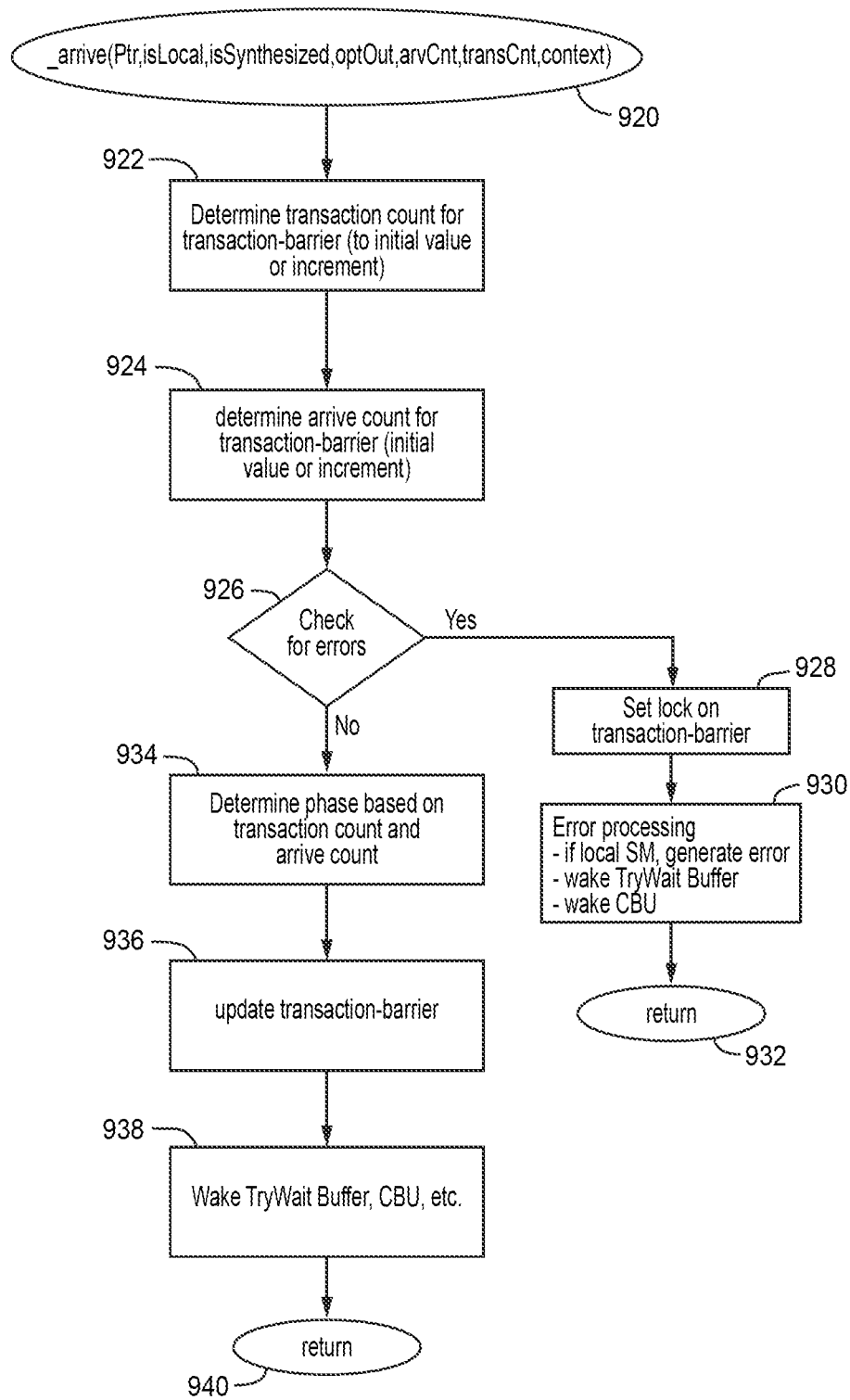

FIG. 9B shows an example_arrive( ) function 920 that is implemented in response to an arrive( ) operation in thread or a transaction. Arrive( ) is called by a thread to indicate that the thread has arrived at a transaction barrier. In some embodiments, the arrive( ) returns the barrier phase to be used for the wait( ) function 950 that would typically be called subsequently by the thread. The arrive( ) is also called by transactions, for example, to notify writing of data to a buffer by the synchronization unit. The input parameters to_arrive( ) include an address of the transaction barrier ("Ptr"), an arrive count ("arvCnt") and a transaction count ("transCnt").

A temporary transaction count, based on which to subsequently update the transaction barrier's transaction count attribute, is determined based on the input parameter transCnt and based on whether the arrive( ) is called by a thread or is being called by or on behalf of a hardware transaction (922). More specifically, if called by a thread, then it is assumed that the system is being notified of the number of transactions to expect (e.g., in the examples of FIGS. 6A-6B, the number of buffers in DataBuf in which to expect new data to be stored). Otherwise, it is assumed the arrive( ) is called by or on behalf of a hardware transaction and the temporary transaction count is set to transCnt representing an amount by which the transaction count attribute of the transaction barrier is to be incremented by. The arrive( ) may include an input parameter which, having a first value when called by a thread and a second value when called by a transaction, is used to determine whether caller is a thread or transaction. If the arrive( ) is called by a transaction, the temporary transaction count is set to the sum of the current value of the transaction barrier's transaction count and the transCnt. If the arrive( ) is called by a thread, then the temporary transaction count is set to the sum of the current value of the transaction barrier's transaction count and the negative of the transCnt.

A temporary arrive count, based on which to subsequently update the transaction barrier's arrive count attribute, is determined based on the input parameter arvCnt (924). For example, the temporary arrive count may be set to the sum of the current value of the transaction barrier's arrival count and the arvCnt.

An error check is performed (926). The error check may check, for example, for the temporary transaction count and the temporary arrive count being valid values.

If an error is detected in the error check at 926, then the transaction barrier lock attribute is set (928), post-locking actions are performed (930), and the arrive( ) returns (932). The lock attribute, when set, prevents hardware from making any changes to the transaction barrier. For example, in some embodiments, once the lock bit is set subsequent arrive and transaction updates are rejected, and may trigger an error state within the processor. For example, when the lock attribute is set, attempted updates to the thread arrive or the transaction counter may cause reporting of an error to the processor. This may allow subsequent error processing to retrieve a barrier's state from the update which caused the error, and the state is not "polluted" by subsequent attempts to update that barrier. In example embodiments, turning off the lock attribute may be restricted to software.

Post-locking actions at 930 may include error processing such as generating an error notification indicating the error that caused the lock to be set. The error may be generated only for threads or transactions from the local SM. In an embodiment, threads or transactions from the same SM as the transaction barrier may be determined based on the value of a input parameter that is set to a predetermined value when the caller is on the same SM. Post-locking actions may also include generating signals to wakeup the try-wait buffer 706 and/or the CBU to which the datapath circuit is connected. The wakeup signals may be any microarchitecture specific wakeup signal, and may be generated for any one or more reasons such as, for example, barrier phase toggle, barrier lock assertion, successful barrier update, try-wait buffer timeout, and traps.

If no error is detected in the error check at 926, then it is determined whether the phase change must occur in accordance with the temporary transaction count and the temporary arrival count (934). For example, the temporary transaction count and the temporary arrive count both being 0 is a condition that should cause a change in the phase of the transaction barrier.

The transaction barrier is updated based on the determined phase, temporary arrival count, and the temporary transaction count (936). For example, when the possible phase values are 0 and 1, the transaction barrier phase count may be toggled based on the determination at 934. Additionally, if the determination at 934 is that a phase change occurs, then the transaction barrier arrive count is set to the expected arrival count of the transaction barrier, and otherwise is set to the temporary transaction count. The transaction barrier transaction count is updated to the temporary transaction count.

After updating the transaction barrier, post-update actions are performed (938). Post-update actions may also include generating signals to wakeup the try-wait buffer 706 and/or the CBU to which the datapath circuit is connected. The wakeup signals may be any microarchitecture specific wakeup signal.

After the post-update actions, the arrive( ) returns (940). In some embodiments, the return may return values such as whether a phase change was made and/or a pointer to the updated transaction barrier.

In example non-limiting embodiments, the arrive( ) function 920 call can be placed anywhere in a thread, and it is the position of the arrive( ) function call that defines the synchronization point within the thread. The developer and/or an optimizing compiler may ensure that the number of threads containing an arrive function call (plus DMA or other appropriate hardware transaction calls) matches the expected number of arrivals programmed into the transaction barrier.

In an example embodiment, the logic similar to the following may be implemented in the barrier datapath circuit 700 for the _arrive( ):

```
pair<bool, TransactionBarState_t >
_arrive(barSPtr, isLocal, isSynthesized, optOut, arvCnt, transCnt, context) {
    TransactionBarState_t *trans = (TransactionBarState_t *)barSPtr;
    TransactionBarState_t oldState = *trans;
    bool toggle;
    bool incomingLoss = (arvCNT >> 20) != 0 || (transCnt >> 21) != 0;
    if (!isSynthesized) transCnt = -transCnt;
    isArvCntNegative = trans->arvCnt != 0;
    tmpArv = {isArvCntNegative[0],trans->arvCnt} + arvCnt;
    tmpTrans = signExt22(trans->transCnt) + transCnt;
    isExpectNegative = trans->ExpectedArv != 0;
    tmpExp = {isExpectNegative, trans->ExpectedArv} + arvCnt;
    bool localLoss = tmpArv > 0 || tmpExp > 0 || (tmpTrans[21] ^ tmpTrans[20]);
    if (localLoss || incomingLoss) trans->lock = 1;
    if (trans->lock) {
        if (isLocal) ERROR(ARRIVE);
        HW_SYNCS_WAKEUP(barSPtr, context);
        HW_CBU_WAKEUP(barSPtr, context);
        return <0, oldState>;
    else {
        trans->transCnt = tempTrans[21:0];
        toggle = tmpArv == 0 && trans->transCnt == 0;
        if (optOut) {
            trans->ExpectedArv = tmpExp;
        }
        trans->phase = toggle ? ~oldState.phase : oldState.phase;
        trans->arvCnt = toggle ? trans->expectedArv : tmpArv[19:0];
        HW_SYNCS_WAKEUP(barSPtr, context);
        HW_CBU_WAKEUP(barSPtr, context);
        return <toggle, oldState>;
    }
}.
```

Figure 9C:
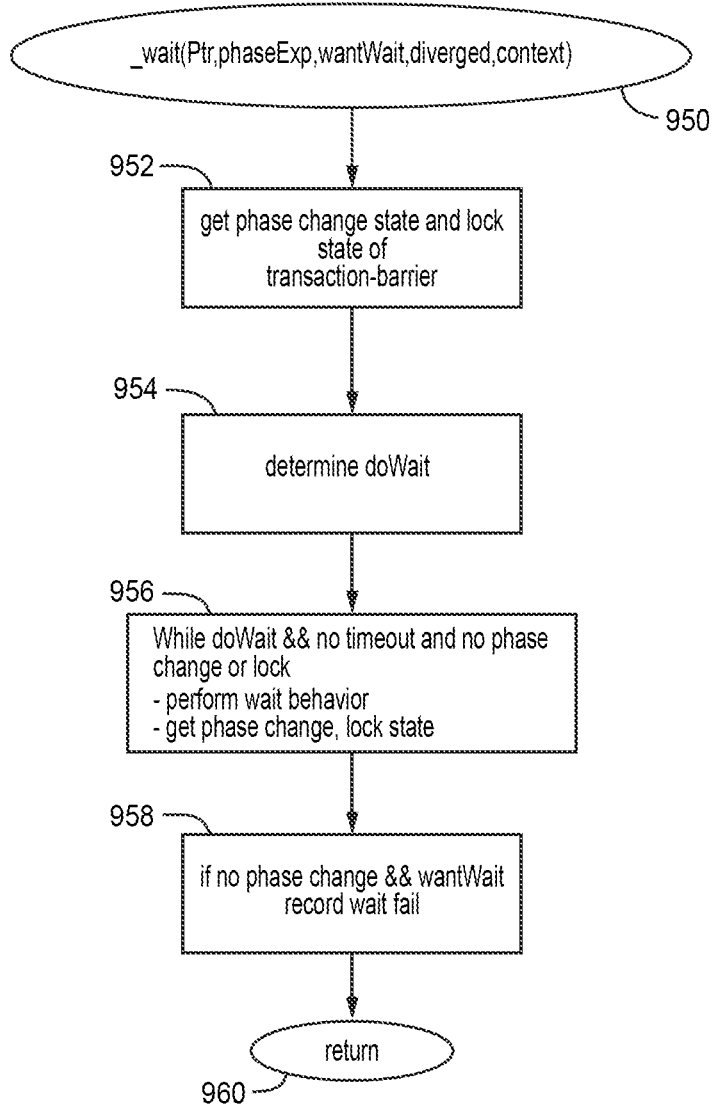

FIG. 9C shows a wait function (950) that is called by a thread to test whether a transaction barrier is set, and if the barrier is set, to wait (block) until the barrier clears. Input parameters include a pointer to the transaction barrier ("Ptr").

The wait( ) may determine the phase change state and the lock state of the transaction barrier (952). The phase change state represent whether the current phase of the transaction barrier matches the phase indicated by an in input parameter to the wait( ) The lock state represents whether or not the lock of the transaction barrier is currently set. If the lock is currently set and/or expected phase is incorrect, then it is determined that the transaction barrier and/or the wait( ) is in an error condition and an error flag is set.

It is determined whether to allow the calling thread to wait. For example, a doWait flag can be set if the thread is determined allowed to wait and not set otherwise (954). In example embodiments, an input parameter may specify whether the thread is requesting a wait, and/or an input parameter may specify whether the calling thread is a diverged (e.g., based on CBU information) thread not to be put in a waiting condition by the hardware synchronization unit 700. In an example embodiment, the doWait flag is set if one or both an input parameter requests wait and an input parameter does not indicate a diverged thread.

When the doWait flag is set and the error flag is not set, a wait action is performed in the synchronization unit 700, phase change state is obtained, and the lock state is obtained (956). The wait action, according to some embodiments, includes signaling by the datapath circuit 702 to add the calling thread to the try-wait buffer 706. This operation may be repeated by the datapath circuit until the barrier is cleared or a timeout is determined. Each repetition may check whether the transaction barrier is in a locked state, whether a phase change has occurred etc.

If no phase change was determined and an input parameter indicated that the thread wanted to wait, then a wait operation fail is recorded (958) by the synchronization unit. The CBU may be notified of the wait fail by the datapath circuit.

After the wait fail is recorded, the arrive( ) returns (960). Return values may include an indication whether or not a phase change occurred, and a pointer to the transaction barrier.

In an example embodiment, the logic similar to the following may be implemented in the barrier datapath circuit 702 for the _wait( ):

```
pair<bool, bool, TransactionBarState_t>
BarSTry(barSPtr, phaseExp, raiseHWW) {
    TransactionBarState_t *trans = (TransactionBarState_t *)barSPtr;
    if (trans->lock && raiseHWW) ERROR(ARRIVE);
    return < !(trans->lock || trans->phase == phaseExp), trans->lock, trans >;
}
pair<bool, TransactionBarState_t >
_wait(barSPtr, phaseExp, wantWait, diverged, context) {
    <toggle, break_out, state> = BarSTry(barSPtr, phaseExp, true);
    canWait = !diverged; //Only wait in SYNCS unit when converged
    doWait = wantWait && can Wait;
    while (doWait && !(timeout || toggle || break_out)) {
        HW_SYNCS_WAIT(barSPtr, phaseExp, context);//uArch specific wait behavior,
either polling or event triggered or mixed
        <toggle, break_out, state> = BarSTry(barSPtr, phaseExp, false); //RTL cost down
behavior, delay HWW observation to next SASS retry
    }
    if (!toggle && wantWait) {
        HW_SYNCS_RECORD_WAIT_FAILURE(barSPtr, phaseExp, context); //uArch
specific failure tracking, can go with imprecise implementation, need to notify CBU
about the failure
    }
    return <toggle, state>;
}.
```

In the particular example shown, since the _wait( ) function 950 uses a value retrieved by an _arrive( ) function 920, and a _wait( ) 950 should be called only after _arrive( ) 920 is called. The two functions could be called one immediately after the other, or any number of instructions or other functions not related to the barrier could be placed between the arrive function 9200 call and the _wait( ) function 950 call. The developer (and/or an optimizing compiler) may wish to put useful work between an _arrive( ) function call 920 and a _wait( ) function call 950 so that processor cycles are not needlessly wasted. If the thread calls _wait( ) function 950 after the barrier phase state has already changed, the thread will not block on the barrier but will instead execute the next instruction after the function call with only a short (e.g., one or two cycle) delay.

In an example embodiment, a _arrive( ) instruction can be initiated by the copy engine, TMA unit, multicast unit, or other hardware unit that does data movement, independently of any software thread of execution. This can occur by hardware in a MMU or a LSU generating a fused atomic load/store command (LDGSTS) to shared memory that essentially performs a direct memory access ("DMA") by the hardware engine to the instance of the primitive stored in shared memory.

In some of the above described ISA functions, a context identifier may be passed as an input parameter. The context identifier may be used to populate the cache with transaction barriers from the memory when a cache miss occurs in accordance with the currently active execution context.

The transaction barrier has several advantages over conventional hardware barriers (e.g. named barriers) and arrive-wait barriers in many scenarios. Since the synchronization unit 700 utilizes cached transaction barriers, even if only a few transaction barriers can be in the cache 704 at a given time, the total number of transaction barriers in the system is only limited by the size of the memory that backs the barrier cache 704. In the example of FIG. 7, the memory backing the cache 704 is shared memory. In some embodiments, the shared memory may be, or may include, distributed shared memory that allows respective CTAs in a CGA access to local shared memory of other CTAs of the same CGA. Thus in contrast to conventional hardware barriers described above, transaction barriers are not limited to only a few barriers. Moreover, whereas the conventional hardware named barrier synch calls were guaranteed to succeed, example embodiments provide improved thread compatibility by allowing the wait( ) in the try-wait buffer to still fail and require software retry by the thread. A key reason behind this wait-may-fail design is to make it thread-as-thread compatible, since the cost required to track wait in divergent threads is infeasible in worst case. While this hardware wait support in the try-wait buffer may not eliminate the software polling loop, the chance of falling into the polling loop and losing performance is expected to be very low in common performance sensitive usage scenarios.

Certain example embodiments may save memory bandwidth because, whereas in previous software barrier implementations the barrier instructions accessed the shared memory, in example embodiments the transaction barrier instructions (e.g., arrive( ) and wait( ) etc.) may be processed by the barrier datapath circuit 702 of the synchronization unit which accesses the locally connected cache 704. Although there is memory traffic between the synchronization unit 700 and the memory backing the cache 704, such traffic is largely primarily due to cache misses and cache overflows in cache 704.

The try-wait buffer in some example embodiments, enables elimination or reduction of the overhead that was associated with the spin loop that was necessitated in some previous software barriers for threads waiting on the barrier. In this architecture, an operation which finds that the barrier has not cleared is held in the try-wait buffer, which is a local buffer. The hardware will notify the operations waiting in the try-wait buffer when the barrier clears. This saves latency because, in addition to the operation not having to spin, the local buffer (to the hardware barrier) receives notification of the clear faster and thus can release the operations faster, yielding a lower latency.

Various designs are possible in the try-wait buffer. For example, threads can be kept track on a per barrier basis so that only the corresponding threads can be released. This enables different implementations. The threads in the try-wait, can retry the barrier when it gets notified that the barrier has cleared. In some embodiments, the thread can proceed as if cleared, when it received the notification that the barrier has cleared. (this is like holding the response, and releasing the response as soon as the clear is notified).

Threads from CTAs on remote SMs and from CTAs on the local can all arrive and wait at the same transaction barrier in the local SM's shared memory. In some embodiments, waiting may be limited to local threads. Embodiments also allow for a different operation from a remote CTA to arrive/update the barrier. For example, the TMA unit or other units that perform asynchronous transactions can update the barrier by a remote arrive operation. The TMA unit receives commands and does memory copies, and as part of the memory copy or as part of the memory copy completion it can update the appropriate transaction barrier(s) by causing the synchronization unit to update the barrier. This allows a thread or other unit to sync with a TMA or the like. e.g., a thread can issue a TMA request, and synchronize when the TMA is done.

From another viewpoint, the transaction barrier enables synchronization of different actions: thread actions which are threads waiting for the barrier to clear and other actions such as transactions from asynchronous hardware units are examples of different actions. Whereas thread actions are substantially the same from one phase to another (e.g., the same number of thread arrivals may be expected in each phase), transactions can be substantially different from one phase to another (e.g., 4 k of data stores may be expected in phase 0, and only 2 k may be expected in the next phase). The transaction barrier is capable of allowing synchronization of these different types of actions, one being of a recurring characteristics and the other being of a dynamic characteristic, separately but simultaneously.

The synchronization unit, in addition to the barrier related arrive/wait operations and try-wait operations, can do other operations such as "memory fences" for outstanding load and stores of participating threads, when the barrier clears. So example embodiments may not only support simply "I arrived", but support more complex actions like "I arrived and make sure that any loads and stores for threads who have arrived have been flushed out and made visible before I make sure that the barrier has cleared". That is, in some embodiments, the synchronization unit can also be configured to insert memory fences. That is the barrier datapath circuit is configured to insert memory fences and the like (as necessary protect the integrity of the data) to the sequence of operations performed in certain barrier operations. For example, when a barrier clears, and when the synchronization unit detects that the barrier clears, it will automatically insert into the hardware memory fences for all the previous loads and stores executed by those threads The synchronization unit can provide hardware acceleration to other sync operations that are not typically hardware accelerated, and/or implement primitives around which software builds its own synchronization. For example, the try-wait buffer can be used for waiting on some item to change—it is not necessarily limited to waiting for a barrier to clear. So in a general case, some value may be in the barrier cache, and a thread can come in and say in effect "I want to be notified when that value changes". The synchronization unit can add the value to the try-wait buffer and can notify the thread when that value changes thereby enabling the thread to avoid spinning.

Example GPU Architecture

An example illustrative architecture in which the programmatic multicast disclosed in this application is incorporated will now be described. The following information is set forth for illustrative purposes and should not be construed as limiting in any manner. Any of the following features may be optionally incorporated with or without the exclusion of other features described.

Figure 10:
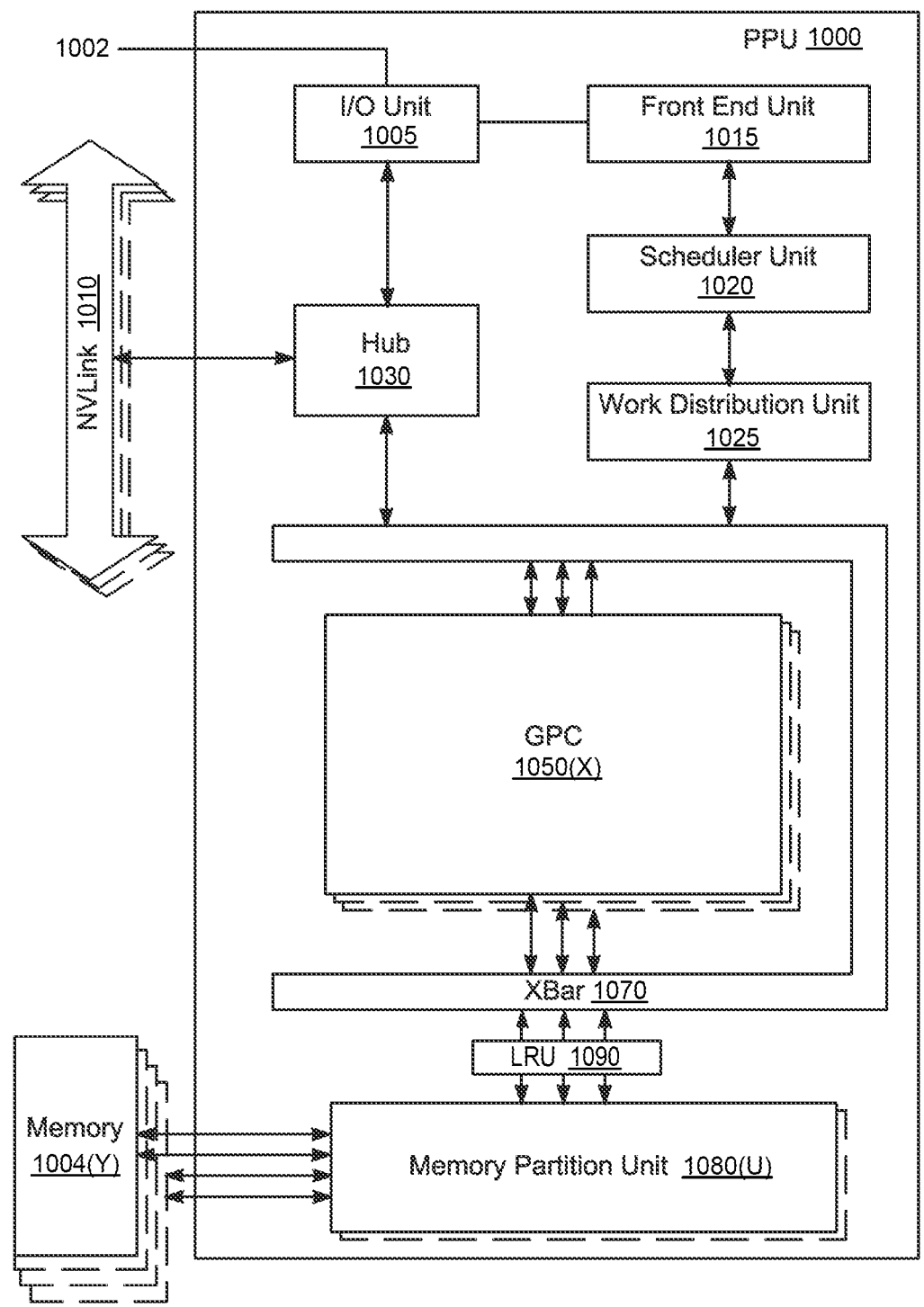
FIG. 10 illustrates an example parallel processing unit of a GPU, according to some embodiments.

FIG. 10 illustrates a parallel processing unit (PPU) 1000, in accordance with an embodiment. In an embodiment, the PPU 1000 is a multi-threaded processor that is implemented on one or more integrated circuit devices. The PPU 1000 is a latency hiding architecture designed to process many threads in parallel. A thread (e.g., a thread of execution) is an instantiation of a set of instructions configured to be executed by the PPU 1000. In an embodiment, the PPU 1000 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 1000 may be utilized for performing general-purpose computations. In some other embodiments, PPU 100 configured to implement large neural networks in deep learning applications or other high performance computing applications.

One or more PPUs 1000 may be configured to accelerate thousands of High Performance Computing (HPC), data center, and machine learning applications. The PPU 1000 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 10, the PPU 1000 includes an Input/Output (I/O) unit 1005, a front end unit 1015, a scheduler unit 1020, a work distribution unit 1025, a hub 1030, a crossbar (Xbar) 1070, one or more general processing clusters (GPCs) 1050, and one or more partition units 1080. An LRC 1080, such as, for example, described above in relation to FIGS. 2 and 2A, may be located between crossbar 1070 and the MPU 1080, and may be configured to support the multicast described above. The PPU 1000 may be connected to a host processor or other PPUs 1000 via one or more high-speed NVLink 1010 interconnect. The PPU 1000 may be connected to a host processor or other peripheral devices via an interconnect 1002. The PPU 1000 may also be connected to a memory comprising a number of memory devices 1004. In an embodiment, the memory 1004 may comprise a number of dynamic random access memory (DRAM) devices. The DRAM devices may be configured as a high-bandwidth memory (HBM) subsystem, with multiple DRAM dies stacked within each device.

The NVLink 1010 interconnect enables systems to scale and include one or more PPUs 1000 combined with one or more CPUs, supports cache coherence between the PPUs 1000 and CPUs, and CPU mastering. Data and/or commands may be transmitted by the NVLink 1010 through the hub 1030 to/from other units of the PPU 1000 such as one or more copy engines, a video encoder, a video decoder, a power management unit, etc. (not explicitly shown). The NVLink 1010 is described in more detail in conjunction with FIG. 13A and FIG. 13B.

The I/O unit 1005 is configured to transmit and receive communications (e.g., commands, data, etc.) from a host processor (not shown) over the interconnect 1002. The I/O unit 1005 may communicate with the host processor directly via the interconnect 1002 or through one or more intermediate devices such as a memory bridge. In an embodiment, the I/O unit 1005 may communicate with one or more other processors, such as one or more of the PPUs 1000 via the interconnect 1002. In an embodiment, the I/O unit 1005 implements a Peripheral Component Interconnect Express (PCIe) interface for communications over a PCIe bus and the interconnect 1002 is a PCIe bus. In alternative embodiments, the I/O unit 1005 may implement other types of well-known interfaces for communicating with external devices.

The I/O unit 1005 decodes packets received via the interconnect 1002. In an embodiment, the packets represent commands configured to cause the PPU 1000 to perform various operations. The I/O unit 1005 transmits the decoded commands to various other units of the PPU 1000 as the commands may specify. For example, some commands may be transmitted to the front end unit 1015. Other commands may be transmitted to the hub 1030 or other units of the PPU 1000 such as one or more copy engines, a video encoder, a video decoder, a power management unit, etc. (not explicitly shown). In other words, the I/O unit 1005 is configured to route communications between and among the various logical units of the PPU 1000.

In an embodiment, a program executed by the host processor encodes a command stream in a buffer that provides workloads to the PPU 1000 for processing. A workload may comprise several instructions and data to be processed by those instructions. The buffer is a region in a memory that is accessible (e.g., read/write) by both the host processor and the PPU 1000. For example, the I/O unit 1005 may be configured to access the buffer in a system memory connected to the interconnect 1002 via memory requests transmitted over the interconnect 1002. In an embodiment, the host processor writes the command stream to the buffer and then transmits a pointer to the start of the command stream to the PPU 1000. The front end unit 1015 receives pointers to one or more command streams. The front end unit 1015 manages the one or more streams, reading commands from the streams and forwarding commands to the various units of the PPU 1000.

The front end unit 1015 is coupled to a scheduler unit 1020 that configures the various GPCs 1050 to process tasks defined by the one or more streams. The scheduler unit 1020 is configured to track state information related to the various tasks managed by the scheduler unit 1020. The state may indicate which GPC 1050 a task is assigned to, whether the task is active or inactive, a priority level associated with the task, and so forth. The scheduler unit 1020 manages the execution of a plurality of tasks on the one or more GPCs 1050.

The scheduler unit 1020 is coupled to a work distribution unit 1025 that is configured to dispatch tasks for execution on the GPCs 1050. The work distribution unit 1025 may track a number of scheduled tasks received from the scheduler unit 1020. In an embodiment, the work distribution unit 1025 manages a pending task pool and an active task pool for each of the GPCs 1050. The pending task pool may comprise a number of slots (e.g., 32 slots) that contain tasks assigned to be processed by a particular GPC 1050. The active task pool may comprise a number of slots (e.g., 4 slots) for tasks that are actively being processed by the GPCs 1050. As a GPC 1050 finishes the execution of a task, that task is evicted from the active task pool for the GPC 1050 and one of the other tasks from the pending task pool is selected and scheduled for execution on the GPC 1050. If an active task has been idle on the GPC 1050, such as while waiting for a data dependency to be resolved, then the active task may be evicted from the GPC 1050 and returned to the pending task pool while another task in the pending task pool is selected and scheduled for execution on the GPC 1050.

The work distribution unit 1025 communicates with the one or more GPCs 1050 via XBar 1070. The XBar 1070 is an interconnect network that couples many of the units of the PPU 1000 to other units of the PPU 1000. For example, the XBar 1070 may be configured to couple the work distribution unit 1025 to a particular GPC 1050. Although not shown explicitly, one or more other units of the PPU 1000 may also be connected to the XBar 1070 via the hub 1030.

The tasks are managed by the scheduler unit 1020 and dispatched to a GPC 1050 by the work distribution unit 1025. The GPC 1050 is configured to process the task and generate results. The results may be consumed by other tasks within the GPC 1050, routed to a different GPC 1050 via the XBar 1070, or stored in the memory 1004. The results can be written to the memory 1004 via the partition units 1080, which implement a memory interface for reading and writing data to/from the memory 1004. The results can be transmitted to another PPU 1004 or CPU via the NVLink 1010. In an embodiment, the PPU 1000 includes a number U of partition units 1080 that is equal to the number of separate and distinct memory devices 1004 coupled to the PPU 1000. A partition unit 1080 will be described in more detail below in conjunction with FIG. 11B.

In an embodiment, a host processor executes a driver kernel that implements an application programming interface (API) that enables one or more applications executing on the host processor to schedule operations for execution on the PPU 1000. In an embodiment, multiple compute applications are simultaneously executed by the PPU 1000 and the PPU 1000 provides isolation, quality of service (QoS), and independent address spaces for the multiple compute applications. An application may generate instructions (e.g., API calls) that cause the driver kernel to generate one or more tasks for execution by the PPU 1000. The driver kernel outputs tasks to one or more streams being processed by the PPU 1000. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads, cooperating threads and a hierarchical grouping of threads such as cooperating thread arrays (CTA) and cooperating group arrays (CGA) according to some embodiments are described in more detail in U.S. application Ser. No. 17/691,621, the entire content of which is hereby incorporated by reference in its entirety.

Figure 11A:
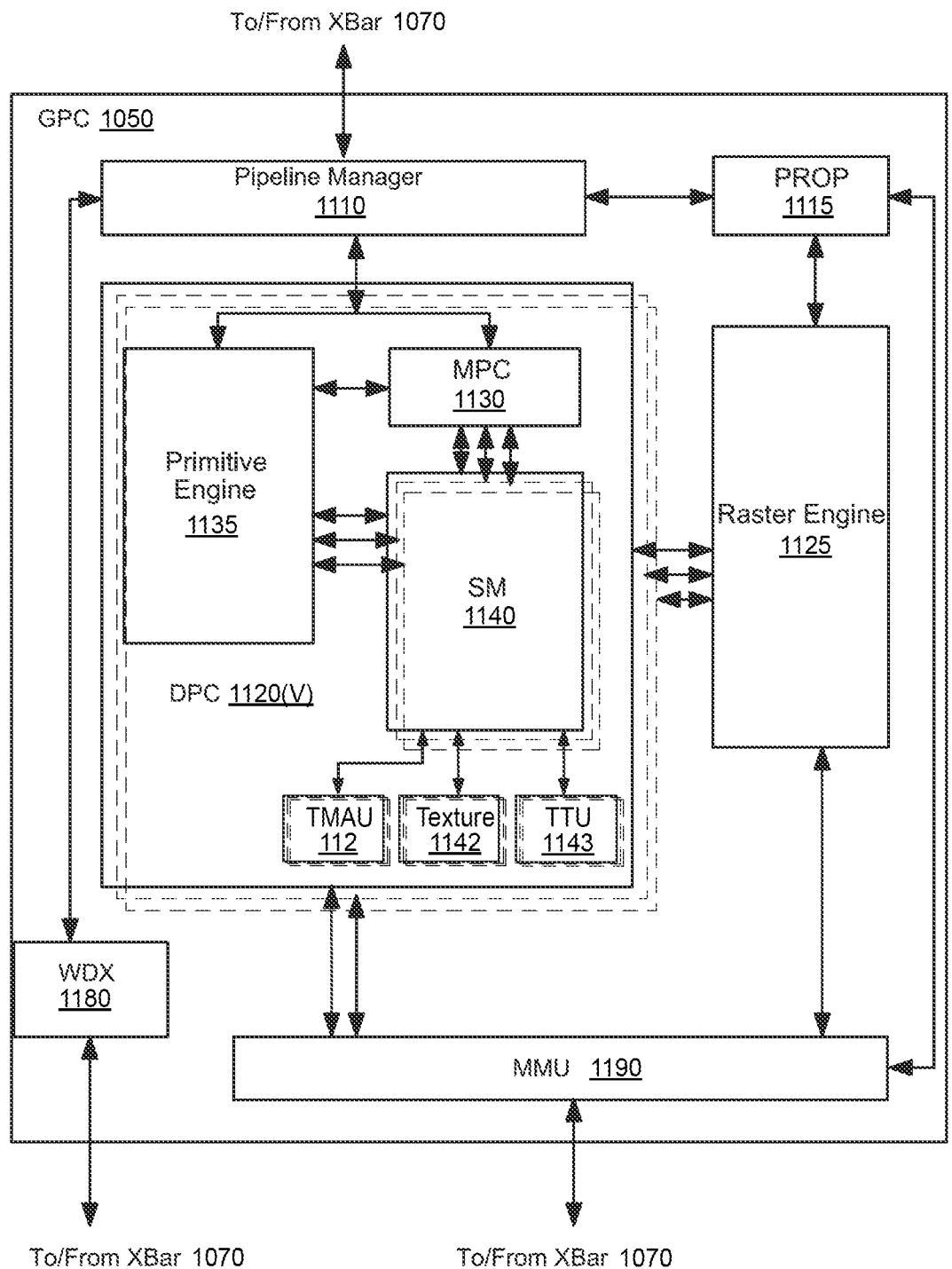
FIG. 11A illustrates an example general processing cluster (GPC) within the parallel processing unit of FIG. 10 with each streaming multiprocessor in the general processing cluster being coupled to a tensor memory access unit, according to some embodiments.

FIG. 11A illustrates a GPC 1050 of the PPU 1000 of FIG. 10, in accordance with an embodiment. As shown in FIG. 11A, each GPC 1050 includes a number of hardware units for processing tasks. In an embodiment, each GPC 1050 includes a pipeline manager 1110, a pre-raster operations unit (PROP) 1115, a raster engine 1125, a work distribution crossbar (WDX) 1180, a memory management unit (MMU) 1190, and one or more Data Processing Clusters (DPCs) 1120. It will be appreciated that the GPC 1050 of FIG. 11A may include other hardware units in lieu of or in addition to the units shown in FIG. 11A.

In an embodiment, the operation of the GPC 1050 is controlled by the pipeline manager 1110. The pipeline manager 1110 manages the configuration of the one or more DPCs 1120 for processing tasks allocated to the GPC 1050. In an embodiment, the pipeline manager 1110 may configure at least one of the one or more DPCs 1120 to implement at least a portion of a graphics rendering pipeline, a neural network, and/or a compute pipeline. For example, with respect to a graphics rendering pipeline, a DPC 1120 may be configured to execute a vertex shader program on the programmable streaming multiprocessor (SM) 1140. The pipeline manager 1110 may also be configured to route packets received from the work distribution unit 1025 to the appropriate logical units within the GPC 1050. For example, some packets may be routed to fixed function hardware units in the PROP 1115 and/or raster engine 1125 while other packets may be routed to the DPCs 1120 for processing by the primitive engine 1135 or the SM 1140.

Figure 11B:
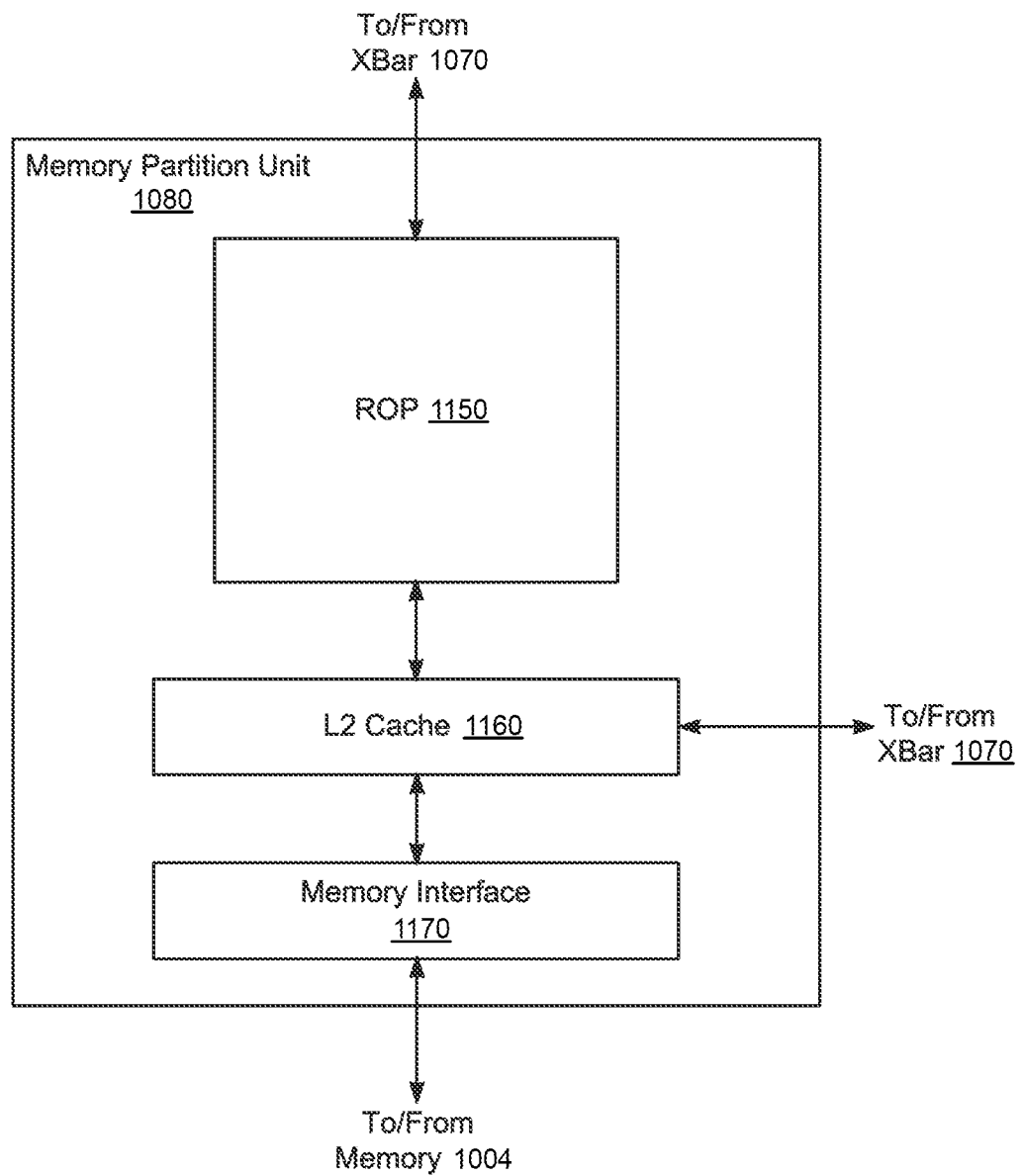
FIG. 11B illustrates an example memory partition unit of the parallel processing unit of FIG. 10.

The PROP unit 1115 is configured to route data generated by the raster engine 1125 and the DPCs 1120 to a Raster Operations (ROP) unit, described in more detail in conjunction with FIG. 11B. The PROP unit 1115 may also be configured to perform optimizations for color blending, organize pixel data, perform address translations, and the like.

Each DPC 1120 included in the GPC 1050 includes an M-Pipe Controller (MPC) 1130, a primitive engine 1135, and one or more SMs 1140. The MPC 1130 controls the operation of the DPC 1120, routing packets received from the pipeline manager 1110 to the appropriate units in the DPC 1120. For example, packets associated with a vertex may be routed to the primitive engine 1135, which is configured to fetch vertex attributes associated with the vertex from the memory 1004. In contrast, packets associated with a shader program may be transmitted to the SM 1140.

The SM 1140 comprises a programmable streaming processor that is configured to process tasks represented by a number of threads. Each SM 1140 is multi-threaded and configured to execute a plurality of threads (e.g., 32 threads) from a particular group of threads concurrently. In an embodiment, the SM 1140 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 1140 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 1140 is described in more detail below in conjunction with FIG. 12A.

The MMU 1190 provides an interface between the GPC 1050 and the partition unit 1080. The MMU 1190 may provide translation of virtual addresses into physical addresses, memory protection, and arbitration of memory requests. In an embodiment, the MMU 1190 provides one or more translation lookaside buffers (TLBs) for performing translation of virtual addresses into physical addresses in the memory 1004.

FIG. 11B illustrates a memory partition unit 1080 of the PPU 1000 of FIG. 10 in accordance with an embodiment. As shown in FIG. 11B, the memory partition unit 1080 includes a Raster Operations (ROP) unit 1150, a level two (L2) cache 1160, and a memory interface 1170. The memory interface 1170 is coupled to the memory 1004. Memory interface 1170 may implement 32, 64, 128, 1024-bit data buses, or the like, for high-speed data transfer. In an embodiment, the PPU 1000 incorporates U memory interfaces 1170, one memory interface 1170 per pair of partition units 1080, where each pair of partition units 1080 is connected to a corresponding memory device 1004. For example, PPU 1000 may be connected to up to Y memory devices 1004, such as high bandwidth memory stacks or graphics double-data-rate, version 5, synchronous dynamic random access memory, or other types of persistent storage.

In an embodiment, the memory interface 1170 implements an HBM2 memory interface and Y equals half U. In an embodiment, the HBM2 memory stacks are located on the same physical package as the PPU 1000, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 1004 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 1000 process very large datasets and/or run applications for extended periods.

In an embodiment, the PPU 1000 implements a multilevel memory hierarchy. In an embodiment, the memory partition unit 1080 supports a unified memory to provide a single unified virtual address space for CPU and PPU 300 memory, enabling data sharing between virtual memory systems. In an embodiment the frequency of accesses by a PPU 1000 to memory located on other processors is traced to ensure that memory pages are moved to the physical memory of the PPU 1000 that is accessing the pages more frequently. In an embodiment, the NVLink 1010 supports address translation services allowing the PPU 1000 to directly access a CPU's page tables and providing full access to CPU memory by the PPU 1000.

In an embodiment, copy engines transfer data between multiple PPUs 1000 or between PPUs 1000 and CPUs. The copy engines can generate page faults for addresses that are not mapped into the page tables. The memory partition unit 1080 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 1004 or other system memory may be fetched by the memory partition unit 1080 and stored in the L2 cache 1160, which is located on-chip and is shared between the various GPCs 1050. As shown, each memory partition unit 1080 includes a portion of the L2 cache 1160 associated with a corresponding memory device 1004. Lower level caches may then be implemented in various units within the GPCs 1050. For example, each of the SMs 1140 may implement a level one (L1) cache. The L1 cache is private memory that is dedicated to a particular SM 1140. Data from the L2 cache 1160 may be fetched and stored in each of the L1 caches for processing in the functional units of the SMs 1140. The L2 cache 1160 is coupled to the memory interface 1170 and the XBar 1070.

The ROP unit 1150 performs graphics raster operations related to pixel color, such as color compression, pixel blending, and the like. The ROP unit 450 also implements depth testing in conjunction with the raster engine 1125, receiving a depth for a sample location associated with a pixel fragment from the culling engine of the raster engine 1125. The depth is tested against a corresponding depth in a depth buffer for a sample location associated with the fragment. If the fragment passes the depth test for the sample location, then the ROP unit 1150 updates the depth buffer and transmits a result of the depth test to the raster engine 1125. It will be appreciated that the number of partition units 1080 may be different than the number of GPCs 1050 and, therefore, each ROP unit 1150 may be coupled to each of the GPCs 1050. The ROP unit 1150 tracks packets received from the different GPCs 1050 and determines which GPC 1050 that a result generated by the ROP unit 1150 is routed to through the Xbar 1070. Although the ROP unit 1150 is included within the memory partition unit 1080 in FIG. 11B, in other embodiment, the ROP unit 1150 may be outside of the memory partition unit 1080. For example, the ROP unit 1150 may reside in the GPC 1050 or another unit.

Figure 12:
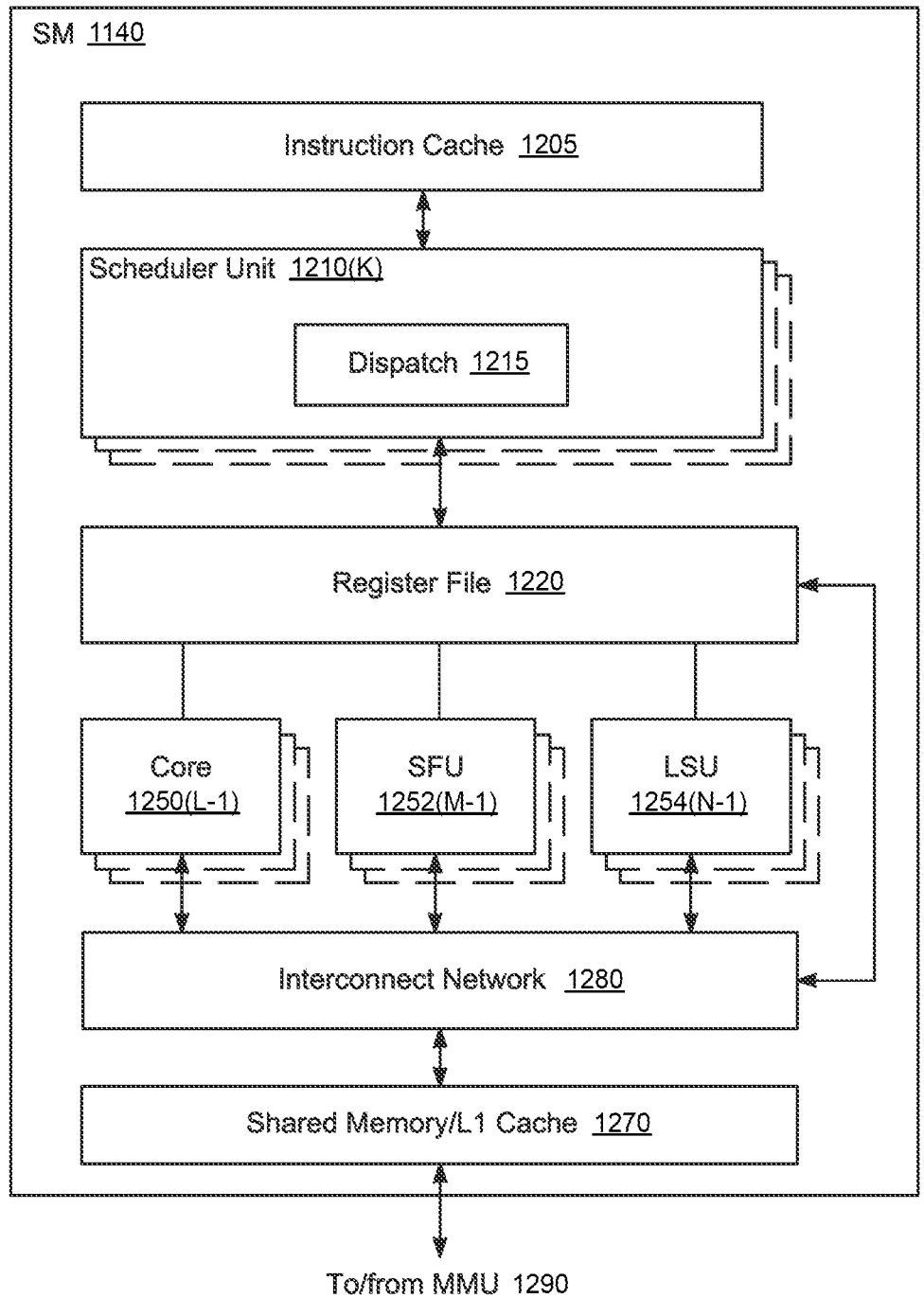
FIG. 12 illustrates an example streaming multiprocessor of FIG. 11A.

FIG. 12 illustrates the streaming multiprocessor 1140 of FIG. 11A, in accordance with an embodiment. As shown in FIG. 12, the SM 1140 includes an instruction cache 1205, one or more scheduler units 1210, a register file 1220, one or more processing cores 1250, one or more special function units (SFUs) 1252, one or more load/store units (LSUs) 1254, an interconnect network 1280, a shared memory/L1 cache 1270.

As described above, the work distribution unit 1025 dispatches tasks for execution on the GPCs 1050 of the PPU 1000. The tasks are allocated to a particular DPC 1120 within a GPC 1050 and, if the task is associated with a shader program, the task may be allocated to an SM 1140. The scheduler unit 1210 receives the tasks from the work distribution unit 1025 and manages instruction scheduling for one or more thread blocks assigned to the SM 1140. The scheduler unit 1210 schedules thread blocks for execution as warps of parallel threads, where each thread block is allocated at least one warp. In an embodiment, each warp executes 32 threads. The scheduler unit 1210 may manage a plurality of different thread blocks, allocating the warps to the different thread blocks and then dispatching instructions from the plurality of different cooperative groups to the various functional units (e.g., cores 1250, SFUs 1252, and LSUs 1254) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks. Hierarchical grouping of threads such as cooperating thread arrays (CTA) and cooperating group arrays (CGA) according to some embodiments are described in more detail in U.S. application Ser. No. 17/691,621, the entire content of which is hereby incorporated by reference in its entirety.

A dispatch unit 1215 is configured to transmit instructions to one or more of the functional units. In the embodiment, the scheduler unit 1210 includes two dispatch units 1215 that enable two different instructions from the same warp to be dispatched during each clock cycle. In alternative embodiments, each scheduler unit 1210 may include a single dispatch unit 1215 or additional dispatch units 1215.

Each SM 1140 includes a register file 1220 that provides a set of registers for the functional units of the SM 1140. In an embodiment, the register file 1220 is divided between each of the functional units such that each functional unit is allocated a dedicated portion of the register file 1220. In another embodiment, the register file 1220 is divided between the different warps being executed by the SM 1140. The register file 1220 provides temporary storage for operands connected to the data paths of the functional units.

Each SM 1140 comprises multiple processing cores 1250. In an embodiment, the SM 1140 includes a large number (e.g., 128, etc.) of distinct processing cores 1250. Each core 1250 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 1250 include 64 single-precision (32-bit) floating point cores, 64 integer cores, 32 double-precision (64-bit) floating point cores, and 8 tensor cores.

Tensor cores are configured to perform matrix operations, and, in an embodiment, one or more tensor cores are included in the cores 1250. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor cores are used to perform much larger two-dimensional or higher dimensional matrix operations, built up from these smaller elements. An API, such as CUDA C++ API, exposes specialized matrix load, matrix multiply and accumulate, and matrix store operations to efficiently use Tensor cores from a CUDA-C++ program. At the CUDA level, the warp-level interface assumes 16×16 size matrices spanning all 32 threads of the warp.

In some embodiments, transposition hardware is included in the processing cores 1250 or another functional unit (e.g., SFUs 1252 or LSUs 1254) and is configured to generate matrix data stored by diagonals and/or generate the original matrix and/or transposed matrix from the matrix data stored by diagonals. The transposition hardware may be provide inside of the shared memory 1270 to register file 1220 load path of the SM 1140.

In one example, the matrix data stored by diagonals may be fetched from DRAM and stored in the shared memory 1270. As the instruction to perform processing using the matrix data stored by diagonals is processed, transposition hardware disposed in the path of the shared memory 1270 and the register file 1220 may provide the original matrix, transposed matrix, compacted original matrix, and/or compacted transposed matrix. Up until the very last storage prior to instruction, the single matrix data stored by diagonals may be maintained, and the matrix type designated by the instruction is generated as needed in the register file 1220.

Each SM 1140 also comprises multiple SFUs 1252 that perform special functions (e.g., attribute evaluation, reciprocal square root, and the like). In an embodiment, the SFUs 1252 may include a tree traversal unit (e.g., TTU 1143) configured to traverse a hierarchical tree data structure. In an embodiment, the SFUs 1252 may include texture unit (e.g., Texture Unit 1142) configured to perform texture map filtering operations. In an embodiment, the texture units are configured to load texture maps (e.g., a 2D array of texels) from the memory 1004 and sample the texture maps to produce sampled texture values for use in shader programs executed by the SM 1140. In an embodiment, the texture maps are stored in the shared memory/L1 cache 1170. The texture units implement texture operations such as filtering operations using mip-maps (e.g., texture maps of varying levels of detail). In an embodiment, each SM 1140 includes two texture units.

Each SM 1140 also comprises multiple LSUs 1254 that implement load and store operations between the shared memory/L1 cache 1270 and the register file 1220. Each SM 1140 includes an interconnect network 1280 that connects each of the functional units to the register file 1220 and the LSU 1254 to the register file 1220, shared memory/L1 cache 1270. In an embodiment, the interconnect network 1280 is a crossbar that can be configured to connect any of the functional units to any of the registers in the register file 1220 and connect the LSUs 1254 to the register file 1220 and memory locations in shared memory/L1 cache 1270.

The shared memory/L1 cache 1270 is an array of on-chip memory that allows for data storage and communication between the SM 1140 and the primitive engine 1135 and between threads in the SM 1140. In an embodiment, the shared memory/L1 cache 1270 comprises 128 KB of storage capacity and is in the path from the SM 1140 to the partition unit 1080. The shared memory/L1 cache 1270 can be used to cache reads and writes. One or more of the shared memory/L1 cache 1270, L2 cache 1160, and memory 1004 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1270 enables the shared memory/L1 cache 1270 to function as a high-throughput conduit for streaming data while simultaneously providing high-bandwidth and low-latency access to frequently reused data.

In the context of this disclosure, an SM or "streaming multiprocessor" means a processor architected as described in U.S. Pat. No. 7,447,873 to Nordquist including improvements thereto and advancements thereof, and as implemented for example in many generations of NVIDIA GPUs. For example, an SM may comprise a plurality of processing engines or cores configured to concurrently execute a plurality of threads arranged in a plurality of single-instruction, multiple-data (SIMD) groups (e.g., warps), wherein each of the threads in a same one of the SIMD groups executes a same data processing program comprising a sequence of instructions on a different input object, and different threads in the same one of the SIMD group are executed using different ones of the processing engines or cores. An SM may typically also provide (a) a local register file having plural lanes, wherein each processing engine or core is configured to access a different subset of the lanes; and instruction issue logic configured to select one of the SIMD groups and to issue one of the instructions of the same data processing program to each of the plurality of processing engines in parallel, wherein each processing engine executes the same instruction in parallel with each other processing engine using the subset of the local register file lanes accessible thereto. An SM typically further includes core interface logic configured to initiate execution of one or more SIMD groups. As shown in the figures, such SMs have been constructed to provide fast local shared memory enabling data sharing/reuse and synchronization between all threads of a CTA executing on the SM.

When configured for general purpose parallel computation, a simpler configuration can be used compared with graphics processing. Specifically, the fixed function graphics processing units shown in FIG. 11A, are bypassed, creating a much simpler programming model. In the general purpose parallel computation configuration, the work distribution unit 1025 assigns and distributes blocks of threads directly to the DPCs 1120. The threads in a block execute the same program, using a unique thread ID in the calculation to ensure each thread generates unique results, using the SM 1140 to execute the program and perform calculations, shared memory/L1 cache 1270 to communicate between threads, and the LSU 1254 to read and write global memory through the shared memory/L1 cache 1270 and the memory partition unit 1080. When configured for general purpose parallel computation, the SM 1140 can also write commands that the scheduler unit 1020 can use to launch new work on the DPCs 1120.

The PPU 1000 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 1000 is embodied on a single semiconductor substrate. In another embodiment, the PPU 1000 is included in a system-on-a-chip (SoC) along with one or more other devices such as additional PPUs 1000, the memory 1004, a reduced instruction set computer (RISC) CPU, a memory management unit (MMU), a digital-to-analog converter (DAC), and the like.

In an embodiment, the PPU 1000 may be included on a graphics card that includes one or more memory devices 1004. The graphics card may be configured to interface with a PCIe slot on a motherboard of a desktop computer. In yet another embodiment, the PPU 1000 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 13A:
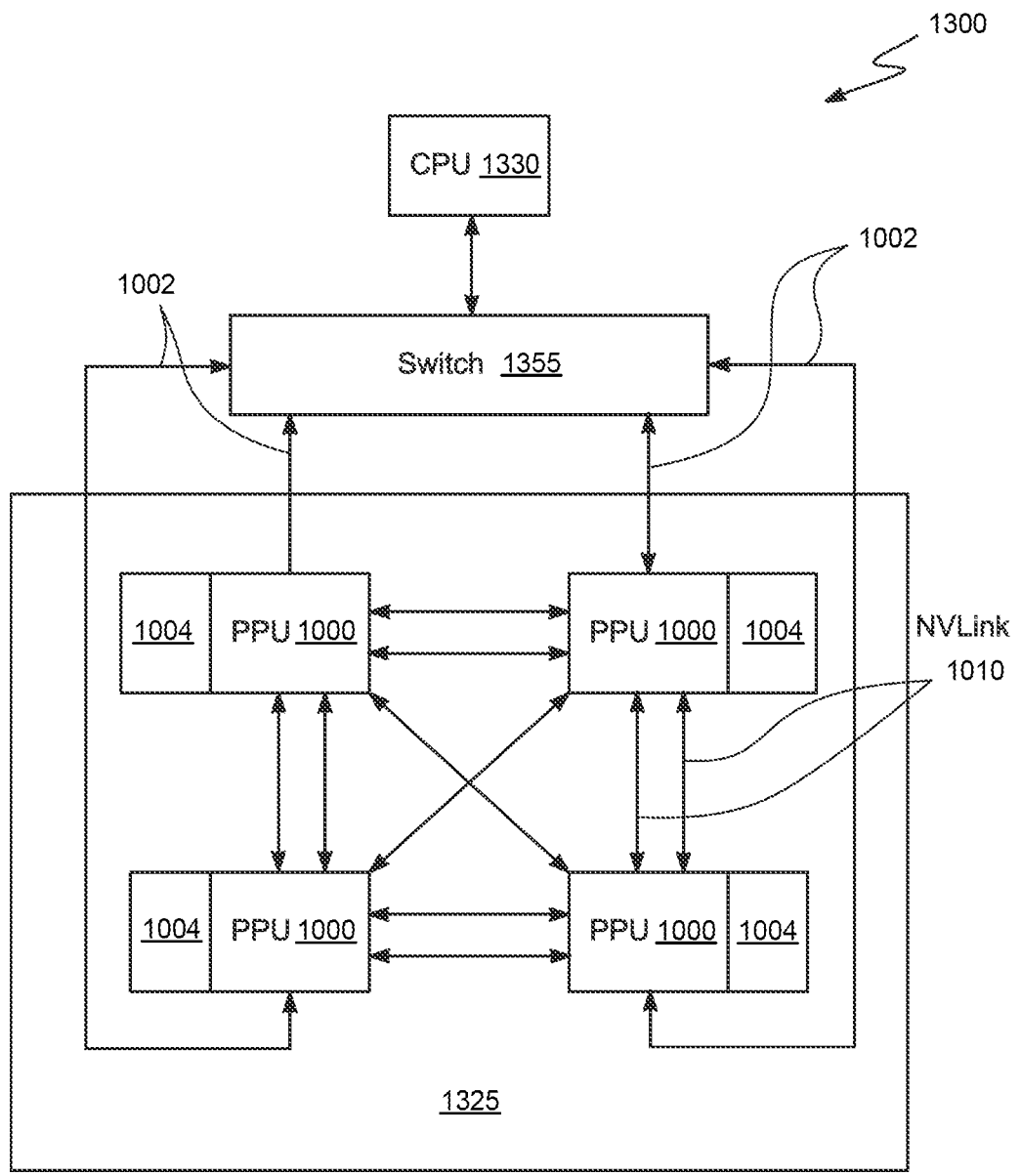
FIG. 13A is an example conceptual diagram of a processing system implemented using the parallel processing unit (PPU) of FIG. 10.

FIG. 13A is a conceptual diagram of a processing system 1300 implemented using the PPU 1000 of FIG. 10, in accordance with an embodiment. The exemplary system 1300 may be configured to implement the methods disclosed in this application (e.g., the TMAU in FIG. 1, 2, 6 or 11A). The processing system 1300 includes a CPU 1330, switch 1355, and multiple PPUs 1000 each and respective memories 1004. The NVLink 1010 provides high-speed communication links between each of the PPUs 1000. Although a particular number of NVLink 1010 and interconnect 1002 connections are illustrated in FIG. 13A, the number of connections to each PPU 1000 and the CPU 1330 may vary. The switch 1355 interfaces between the interconnect 1002 and the CPU 1330. The PPUs 1000, memories 1004, and NVLinks 1010 may be situated on a single semiconductor platform to form a parallel processing module 1325. In an embodiment, the switch 1355 supports two or more protocols to interface between various different connections and/or links.

In another embodiment (not shown), the NVLink 1010 provides one or more high-speed communication links between each of the PPUs 1000 and the CPU 1330 and the switch 1355 interfaces between the interconnect 1002 and each of the PPUs 1000. The PPUs 1000, memories 1004, and interconnect 1002 may be situated on a single semiconductor platform to form a parallel processing module 1325. In yet another embodiment (not shown), the interconnect 1002 provides one or more communication links between each of the PPUs 1000 and the CPU 1330 and the switch 1355 interfaces between each of the PPUs 1000 using the NVLink 1010 to provide one or more high-speed communication links between the PPUs 1000. In another embodiment (not shown), the NVLink 1010 provides one or more high-speed communication links between the PPUs 1000 and the CPU 1330 through the switch 1355. In yet another embodiment (not shown), the interconnect 1002 provides one or more communication links between each of the PPUs 1000 directly. One or more of the NVLink 1010 high-speed communication links may be implemented as a physical NVLink interconnect or either an on-chip or on-die interconnect using the same protocol as the NVLink 1010.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1325 may be implemented as a circuit board substrate and each of the PPUs 1000 and/or memories 1004 may be packaged devices. In an embodiment, the CPU 1330, switch 1355, and the parallel processing module 1325 are situated on a single semiconductor platform.

In an embodiment, the signaling rate of each NVLink 1010 is 20 to 25 Gigabits/second and each PPU 1000 includes six NVLink 1010 interfaces (as shown in FIG. 13A, five NVLink 1010 interfaces are included for each PPU 1000). Each NVLink 1010 provides a data transfer rate of 25 Gigabytes/second in each direction, with six links providing 1000 Gigabytes/second. The NVLinks 1010 can be used exclusively for PPU-to-PPU communication as shown in FIG. 13A, or some combination of PPU-to-PPU and PPU-to-CPU, when the CPU 1330 also includes one or more NVLink 1010 interfaces.

In an embodiment, the NVLink 1010 allows direct load/store/atomic access from the CPU 1330 to each PPU's 1000 memory 1004. In an embodiment, the NVLink 1010 supports coherency operations, allowing data read from the memories 1004 to be stored in the cache hierarchy of the CPU 1330, reducing cache access latency for the CPU 1330. In an embodiment, the NVLink 1010 includes support for Address Translation Services (ATS), allowing the PPU 1000 to directly access page tables within the CPU 1330. One or more of the NVLinks 1010 may also be configured to operate in a low-power mode.

Figure 13B:
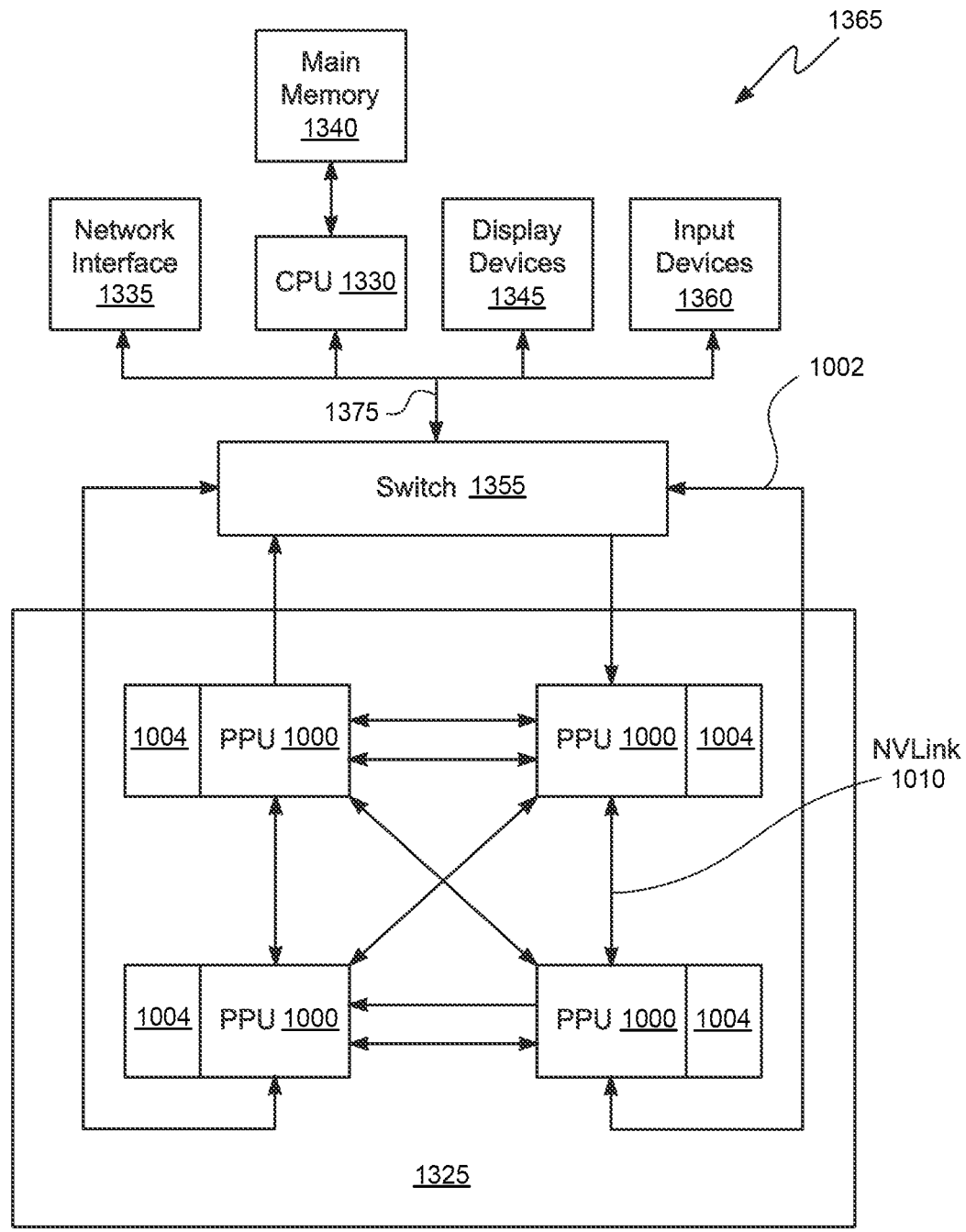
FIG. 13B is a block diagram of an exemplary system in which the various architecture and/or functionality of the various previous embodiments may be implemented.

FIG. 13B illustrates an exemplary system 1365 in which the various architecture and/or functionality of the various previous embodiments may be implemented. The exemplary system 1365 may be configured to implement the methods disclosed in this application (e.g., the TMAU in FIG. 1, 2, 6 or 11A).

As shown, a system 1365 is provided including at least one central processing unit 1330 that is connected to a communication bus 1375. The communication bus 1375 may be implemented using any suitable protocol, such as PCI (Peripheral Component Interconnect), PCI-Express, AGP (Accelerated Graphics Port), HyperTransport, or any other bus or point-to-point communication protocol(s). The system 1365 also includes a main memory 1340. Control logic (software) and data are stored in the main memory 1340 which may take the form of random access memory (RAM).

The system 1365 also includes input devices 1360, the parallel processing system 1325, and display devices 1345, e.g. a conventional CRT (cathode ray tube), LCD (liquid crystal display), LED (light emitting diode), plasma display or the like. User input may be received from the input devices 1360, e.g., keyboard, mouse, touchpad, microphone, and the like. Each of the foregoing modules and/or devices may even be situated on a single semiconductor platform to form the system 1365. Alternately, the various modules may also be situated separately or in various combinations of semiconductor platforms per the desires of the user.

Further, the system 1365 may be coupled to a network (e.g., a telecommunications network, local area network (LAN), wireless network, wide area network (WAN) such as the Internet, peer-to-peer network, cable network, or the like) through a network interface 1335 for communication purposes.

The system 1365 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1340 and/or the secondary storage. Such computer programs, when executed, enable the system 1365 to perform various functions. The memory 1340, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 1365 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

An application program may be implemented via an application executed by a host processor, such as a CPU. In an embodiment, a device driver may implement an application programming interface (API) that defines various functions that can be utilized by the application program in order to generate graphical data for display. The device driver is a software program that includes a plurality of instructions that control the operation of the PPU 1000. The API provides an abstraction for a programmer that lets a programmer utilize specialized graphics hardware, such as the PPU 1000, to generate the graphical data without requiring the programmer to utilize the specific instruction set for the PPU 1000. The application may include an API call that is routed to the device driver for the PPU 1000. The device driver interprets the API call and performs various operations to respond to the API call. In some instances, the device driver may perform operations by executing instructions on the CPU. In other instances, the device driver may perform operations, at least in part, by launching operations on the PPU 1000 utilizing an input/output interface between the CPU and the PPU 1000. In an embodiment, the device driver is configured to implement the graphics processing pipeline 1400 utilizing the hardware of the PPU 1000.

Various programs may be executed within the PPU 1000 in order to implement the various stages of the processing for the application program. For example, the device driver may launch a kernel on the PPU 1000 to perform one stage of processing on one SM 1140 (or multiple SMs 1140). The device driver (or the initial kernel executed by the PPU 1000) may also launch other kernels on the PPU 1000 to perform other stages of the processing. If the application program processing includes a graphics processing pipeline, then some of the stages of the graphics processing pipeline may be implemented on fixed unit hardware such as a rasterizer or a data assembler implemented within the PPU 1000. It will be appreciated that results from one kernel may be processed by one or more intervening fixed function hardware units before being processed by a subsequent kernel on an SM 1140.

All patents, patent applications and publications cited herein are incorporated by reference for all purposes as if expressly set forth.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A synchronization barrier unit comprising:
   a cache configured to store, in a cache line, a synchronization barrier retrieved from an address in a memory, wherein the synchronization barrier stored in the cache line comprises at least a tag derived based on the address at which the synchronization barrier is stored in the memory, a thread arrive counter updated in response to thread arrive operations and a transaction counter updated in response to asynchronous transaction operations; and a circuit connected to the cache and configured to synchronize a plurality of threads and at least one asynchronous transaction based on the synchronization barrier stored in the cache, wherein the circuit comprises hardware circuitry to update the thread arrive counter in response to the thread arrive operations and to update the transaction counter in response to the asynchronous transaction operations, wherein the synchronization barrier is configured to be located in a level 2 cache memory.

2. The synchronization barrier unit according to claim 1, further comprising a buffer connected to the circuit, wherein the circuit is configured to:

store, in the buffer, information of one or more threads waiting on the synchronization barrier; and notify the one or more threads when the synchronization barrier is cleared.

3. The synchronization barrier unit according to claim 2, further comprising a multiplexer configured to serialize operations that are input to the circuit.

4. The synchronization barrier unit according to claim 3, further comprising one or more coalescing circuits configured to coalesce thread arrive operations from a remote processor, asynchronous transaction completion operations from a remote hardware unit, thread arrive operations from a local processor and/or asynchronous transaction completion operations from a local hardware unit, and wherein the multiplexer is further configured to receive operations from the one or more coalescing circuits.

5. The synchronization barrier unit according to claim 4, wherein the multiplexer is further configured to receive operations from the buffer.

6. The synchronization barrier unit according to claim 1, wherein the circuit is configured to, in response to a thread arrive operation of a first thread, update only the arrive counter, and in response to a thread arrive operation of a second thread, update both the arrive counter and the transaction counter.

7. The synchronization barrier unit according to claim 1, wherein the synchronization barrier further comprises a phase counter, wherein the circuit is configured to change a value of the phase counter in response to the synchronization barrier satisfying a clearing condition.

8. The synchronization barrier unit according to claim 7, wherein the synchronization barrier further comprises an expected arrival count, and wherein the circuit is further configured to, in response to the synchronization barrier satisfying a clearing condition, reinitialize the arrival counter with a value of the expected arrival count.

9. The synchronization barrier unit according to claim 7, wherein the synchronization barrier further comprises an expected transaction count, and wherein the circuit is further configured to, in response to the synchronization barrier satisfying a clearing condition, reinitialize the transaction counter with a value of the expected transaction count.

10. The synchronization barrier unit according to claim 1, wherein the synchronization barrier further comprises a lock attribute, wherein the circuit is configured to set the lock attribute in response to detecting an error condition.

11. The synchronization barrier unit according to claim 10, wherein the circuit is configured to, when the lock attribute is set, prevent updates to the thread arrive counter and the transaction counter.

12. The synchronization barrier unit according to claim 11, when the lock attribute is set, attempted updates to the thread arrive counter or the transaction counter cause reporting of an error to the processor.

13. The synchronization barrier unit according to claim 1, wherein the memory is a shared memory.

14. The synchronization barrier unit according to claim 1, wherein the memory is a global memory.

15. The synchronization barrier unit according to claim 1, wherein the cache is configured to store a plurality of synchronization barriers, and wherein the circuit is configured to operate on the plurality of synchronization barriers stored in the cache.

16. The synchronization barrier unit according to claim 15, wherein the plurality of the synchronization barriers stored in the cache simultaneously is a subset of synchronization barriers stored in the memory.

17. The synchronization barrier unit according to claim 16, wherein a cache entry in the cache comprises a synchronization barrier from the plurality of the synchronization barriers stored in the cache, and a tag having a value derived from an address of the synchronization barrier in the memory.

18. The synchronization barrier unit according to claim 1, further comprising a buffer connected to the circuit, wherein the circuit is configured to:

store, in the buffer, information of a thread waiting on the synchronization barrier; and in response to the synchronization barrier being cleared or an occurrence of a timeout event, providing for the thread to retry the synchronization barrier.

19. The synchronization barrier unit according to claim 1, wherein the circuit is connected to at least one of a convergence barrier unit or a scoreboard.

20. A system comprising:

a plurality of layer 2 (L2) cache memories;

a plurality of processors, each connected to at least one L2 cache memory of the plurality of L2 cache memories;

one or more interconnects connecting the plurality of L2 cache memories and the plurality of processors; and a synchronization unit located in one of the processors or one of the L2 cache memories, wherein the synchronization unit comprises:

a cache configured to store, in a cache line, a synchronization barrier retrieved from an address in a memory, wherein the synchronization barrier stored in the cache line comprises at least a tag derived based on the address at which the synchronization barrier is stored in the memory, a thread arrive counter updated in response to thread arrive operations and a transaction counter updated in response to asynchronous transaction operations; and a circuit connected to the cache and configured to synchronize a plurality of threads and at least one asynchronous transaction based on the synchronization barrier stored in the cache, wherein the circuit comprises hardware circuitry to update the thread arrive counter in response to the thread arrive operations and to update the transaction counter in response to the asynchronous transaction operations.

21. The system according to claim 20, wherein the circuit is configured to:

determine a cleared status of the synchronization barrier based on a current value of a thread arrive counter and a current value of a transaction counter of the synchronization barrier, wherein the thread arrive counter is updated for each occurrence of a thread arrive operation and the transaction counter is updated for each occurrence of an asynchronous transaction operation; and for each thread of a plurality of threads, block the thread at a thread wait operation based on the determined cleared status of the synchronization barrier.

22. The system according to claim 21, wherein the asynchronous transaction operations represents a data movement by an asynchronous hardware processing unit.

23. The system according to claim 21, wherein the circuit is further configured to:

before the determining, initialize the thread arrive counter with an initially expected number of occurrences of thread arrive operations based on an expected arrival number attribute of the synchronization barrier, and initializing the transaction counter in accordance with a received thread arrive operation;

adjust the thread arrive counter in accordance with each received thread arrive operation; and adjust the transaction counter in accordance with each asynchronous transaction operation.

24. The system according to claim 23, wherein said determining comprises determining, when the thread arrive counter indicates that an initially expected number of occurrences of thread arrive operations have been received and the transaction counter indicates that an initially expected number of asynchronous transaction operations have been received, the synchronization barrier is cleared.

25. The system according to claim 21, wherein the synchronization barrier further comprises a phase counter configured to track a phase of the synchronization barrier, and wherein the circuit is further configured to:

in response to the determining that the synchronization barrier is cleared, adjust a value of the phase counter and perform said initializing.

26. The system according to claim 21, wherein said blocking the thread comprises inserting, by the circuit, an entry corresponding to the thread in a buffer connected to the circuit.

27. The system according to claim 26, wherein the circuit is further configured to, in response to the determining that the synchronization barrier has cleared, notifying the buffer and releasing the entry from the buffer.

28. The system according to claim 27, wherein, in response to the notifying, retrying the synchronization barrier by the thread.

* * * * *